United States Patent
Miyamaru et al.

(10) Patent No.: US 7,090,619 B2
(45) Date of Patent: Aug. 15, 2006

(54) TWO-WHEELED VEHICLE SIMULATION APPARATUS

(75) Inventors: Yukio Miyamaru, Saitama (JP); Atsushi Yonehana, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/085,371

(22) Filed: Mar. 21, 2005

(65) Prior Publication Data
US 2005/0233285 A1  Oct. 20, 2005

(30) Foreign Application Priority Data
Mar. 31, 2004  (JP) .............................. 2004-102633

(51) Int. Cl.
*A63B 21/00* (2006.01)
(52) U.S. Cl. ...................................................... 482/57
(58) Field of Classification Search ................ 482/1–9, 482/51, 57–65, 900–902; 434/29, 61; 463/1, 463/6, 7; 273/148 R, 148 B; 472/88, 89; 446/465; 280/29, 63; 180/9.25
See application file for complete search history.

(56) References Cited

U.S. PATENT DOCUMENTS 5,006,072 A * 4/1991 Letovsky et al. ............. 434/61
6,030,223 A * 2/2000 Sugimori ..................... 434/61
6,609,912 B1 * 8/2003 Harashima et al. ........... 434/61
2003/0171190 A1  9/2003 Rice

FOREIGN PATENT DOCUMENTS

JP  2589581  11/1998

* cited by examiner

*Primary Examiner*—Glenn E. Richman
(74) *Attorney, Agent, or Firm*—Carrier, Blackman & Associates, P.C.; Joseph P. Carrier; William D. Blackman

(57) ABSTRACT

A two-wheeled vehicle simulation apparatus includes a vehicle simulator having a saddle which the driver sits on and handlebars operated by the driver, a mat switch laid on a floor in the vicinity of the vehicle simulator, and a monitor displaying information and images based on signals obtained from pedals, the handlebars, and the mat switch. Two or more of the mat switches are provided to independently sense respective placement of one or both feet on the floor by the driver. When two detectors substantially alternately detect placement of the driver's right and left feet on the floor, an image of a two-wheeled vehicle and a person walking the two-wheeled vehicle is displayed on the monitor. The vehicle simulator permits simulation of the action of a driver putting his/her foot on a road surface to achieve more realistic simulation.

9 Claims, 29 Drawing Sheets

FIG. 12

| COMMAND | PROCESS | |
|---|---|---|
| UP<br>DOWN<br>HEAVY<br>LIGHT<br>⋮ | BIRD'S EYE VIEW DISPLAY<br>DRIVER'S VIEW DISPLAY<br>INCREASE LOAD/INCREASE SPEED COEFFICIENT<br>REDUCE LOAD/REDUCE SPEED COEFFICIENT<br>⋮ | 202a |
| BIRD'S EYE POINT OF VIEW<br>DRIVER'S POINT OF VIEW<br>UPSHIFT<br>DOWNSHIFT<br>⋮ | BIRD'S EYE VIEW DISPLAY<br>DRIVER'S VIEW DISPLAY<br>INCREASE LOAD/INCREASE SPEED COEFFICIENT<br>REDUCE LOAD/REDUCE SPEED COEFFICIENT<br>⋮ | 202b |
| LEFT<br>RIGHT<br>⋮ | LEFT SIDE SCREEN DISPLAY<br>RIGHT SIDE SCREEN DISPLAY<br>⋮ | 202c |

TWO-WHEELED VEHICLE SIMULATION APPARATUS

CROSS-REFERENCE TO RELATED APPLICATIONS

The present invention claims priority under 35 USC 119 based on Japanese patent application No. 2004-102633, filed on Mar. 31, 2004. The subject matter of this priority document is incorporated by reference herein.

BACKGROUND OF THE INVENTION

1. Field of the Invention

The present invention relates to a two-wheeled vehicle simulation apparatus having application to traffic safety education, games, and physical training.

2. Description of the Background Art

Simulation apparatuses have been proposed and developed that simulate the operation of airplanes, automobiles, motorcycles, bicycles and the like. Some of the simulation apparatuses have been put to practical use. Among known simulation apparatuses, a bicycle simulation apparatus has some similarity to a motorcycle simulation apparatus, but is significantly different therefrom because a bicycle, and thus its associated simulation apparatus, has cranks and pedals. An example of a known bicycle simulation apparatus is disclosed in Japanese Registered Utility Model No. 2589581.

In the course of driving a two-wheeled vehicle, the driver is not always in one posture on a seat, which is different from driving an automobile or the like. For example, when operating a two-wheeled vehicle, a driver puts his/her foot on the road when temporarily stopping at an intersection or the like, and walks the bicycle on a pedestrian dedicated road such as a sidewalk. However, the conventional two-wheeled vehicle simulation apparatus employs a system performing driving simulation in which the driver always remains astride the seat. Thus, the actions of getting on and off the vehicle, the action of putting his/her foot on the road when the vehicle temporarily stops, and the action of walking the vehicle cannot be reproduced in the simulated environment. Accordingly, the simulation lacks a hands-on feeling compared to real operation of the two-wheeled vehicle. Moreover, the actions of the driver putting his/her foot on the road and walking the vehicle are necessary actions in traffic safety education, for example, and thus it is desirable for the two-wheeled vehicle simulation apparatus to simulate these actions.

Furthermore, in the conventional two-wheeled vehicle simulation apparatus, the driver is required to perform operations of turning on and off the power supply and of starting and terminating the driving simulation when getting on and off the two-wheeled vehicle simulator. Thus, prior to use, a user may be required to read an operation manual or the like, or to be instructed by an instructor. In addition, traffic safety education is often conducted particularly for children, and it is desired that the basic operations of the two-wheeled vehicle simulation apparatus do not require a manual or the like, and be easily performed even by children.

The present invention was made in light of such problems, and an object of the present invention is to provide a two-wheeled vehicle simulation apparatus capable of simulating the action of the driver putting his/her foot on the road to achieve a more realistic driving simulation. Another object of the present invention is to provide a two-wheeled vehicle simulation apparatus capable of performing driving simulation using easy operations.

SUMMARY OF THE INVENTION

A two-wheeled vehicle simulation apparatus according to the present invention includes a two-wheeled vehicle simulator having a seat upon which a driver sits, and a steering section operated by the driver. The simulator includes a driver sensing section for sensing if the driver puts his/her foot on a floor in the vicinity of the two-wheeled vehicle simulator. The simulator further includes a display section displaying information based on operation of the steering section and a signal of the driver sensing section.

As described above, by sensing if the driver puts his/her foot on the floor with the driver sensing section, and by displaying information based on such foot placement, the action of the driver putting his/her foot on the floor is simulated to achieve a realistic driving simulation.

In this case, preferably, the driver sensing section is a mat switch provided on the floor in the vicinity of the two wheeled vehicle simulator, the mat switch sensing whether the driver steps on the mat switch with his/her foot.

Moreover, preferably, two or more of the driver sensing sections are provided. Use of plural driver sensing section permits the simulator to independently sense the placement and location of each foot of the driver, as the driver places his/her left and right feet on the floor. When two drive detectors substantially alternately detect that the driver's left and right feet are placed on the floor, images of a two-wheeled vehicle and a person walking the two-wheeled vehicle are displayed on the display section. This enables the simulation of the action of walking a two-wheeled vehicle on a sidewalk and the like.

Furthermore, the driver sensing section is provided on the floor under the seat such that the driver can step on the driver sensing section with his/her foot while sitting on the seat. This enables simulation of an action of putting a foot on the floor during a temporary stop at an intersection or the like.

Preferably, when the driver sensing section senses that the driver has placed his/her foot on the floor, an image of a person putting his/her foot on a road surface while sitting on a seat of a two-wheeled vehicle, or an image of a person standing beside the two-wheeled vehicle is displayed on the display section, as appropriate from the data receive from the driver sensing section.

The driving simulation can be automatically started or terminated based on the signal of the driver sensing section, thus facilitating the ease of operation of the two-wheeled vehicle simulation apparatus.

In the two-wheeled vehicle simulation apparatus according to the present invention, the action of the driver putting his/her foot on the road is simulated based on information emitted from the driver sensing section, thus enabling more realistic driving simulation.

In addition, the two-wheeled vehicle simulation apparatus according to the present invention can be easily operated, and even a child, for example, can perform driving simulation.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

FIG. 12 is an explanatory view showing contents of town travel dictionary data.

DETAILED DESCRIPTION OF THE INVENTION

Hereinafter, a description is given of a two-wheeled vehicle simulation apparatus according to the present invention citing a mode of an embodiment with reference to accompanying FIGS. 1 to 29.

Figure 1:
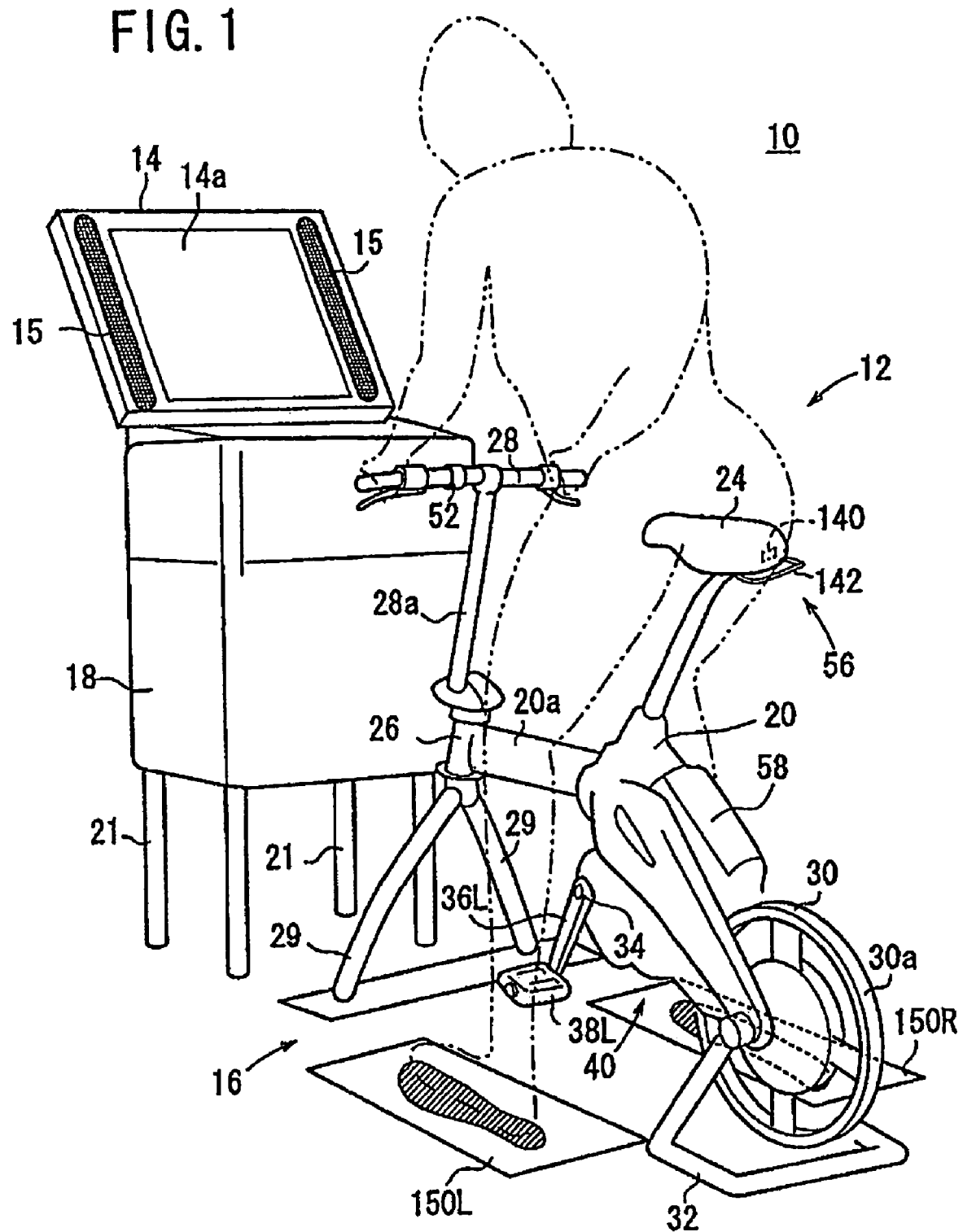
FIG. 1 is a perspective view of a bicycle simulation apparatus according to an embodiment of the present invention.

As shown in FIG. 1, a two-wheeled vehicle simulation apparatus 10 according to an embodiment is a simulation apparatus for a bicycle and includes a bicycle simulator (two-wheeled vehicle simulator) 12, a monitor (visual display section) 14 displaying a scene corresponding to the operation of the bicycle simulator 12 on a screen 14a, and speakers 15 giving a driver audible instructions and outputting simulated sounds. The simulation apparatus 10 includes a mat switch 16 provided at a position where the driver gets on and off, and a main controller 18 controlling the entire two-wheeled vehicle simulation apparatus 10. The main controller 18 is arranged in front of the bicycle simulator 12, and the monitor 14 and the speakers 15 are arranged at a location above the main controller 18 so as to be easily viewed by the driver.

On the screen 14a of the monitor 14, a voice recognition mark 19 (see FIG. 10) is displayed. The voice recognition mark 19 indicates that a voice recognition process is enabled under an operation of a voice recognition section 190 (see FIG. 10). The voice recognition mark 19 is composed of a mark having a shape of a microphone and a string "MICROPHONE ON." The main controller 18, monitor 14, and speakers 15 are supported by four adjustable supports 21 so as to permit the vertical adjustment thereof. In this manner, the height of the monitor 14 and speakers 15 can be adjusted to fit the body size of the driver. The monitor 14 may be provided in alternative positions. For example, the monitor 14 may be a small in size, and be provided on handlebars 28.

Next, a description is given of the bicycle simulator 12. Hereinafter, components which are provided having one each on the left and right sides are distinctly described by giving "L" to the reference numeral of the left one and "R" to the reference numeral of the right one.

The bicycle simulator 12 includes a frame 20, a saddle (seat) 24 connected to the frame 20 through a seat pillar, the handlebars 28 rotatable around a head tube 26 of the frame 20 as a supporting axis, two front forks 29 as a stand fixedly supporting the head tube 26, an iron flywheel 30 provided at a rear end of the frame 20, and a back stand 32 supporting the frame 20 such that the flywheel 30 is spaced from the floor surface. The heights of the saddle 24 and handlebars 28 can be adjusted to fit the body size of the driver.

Figure 2:
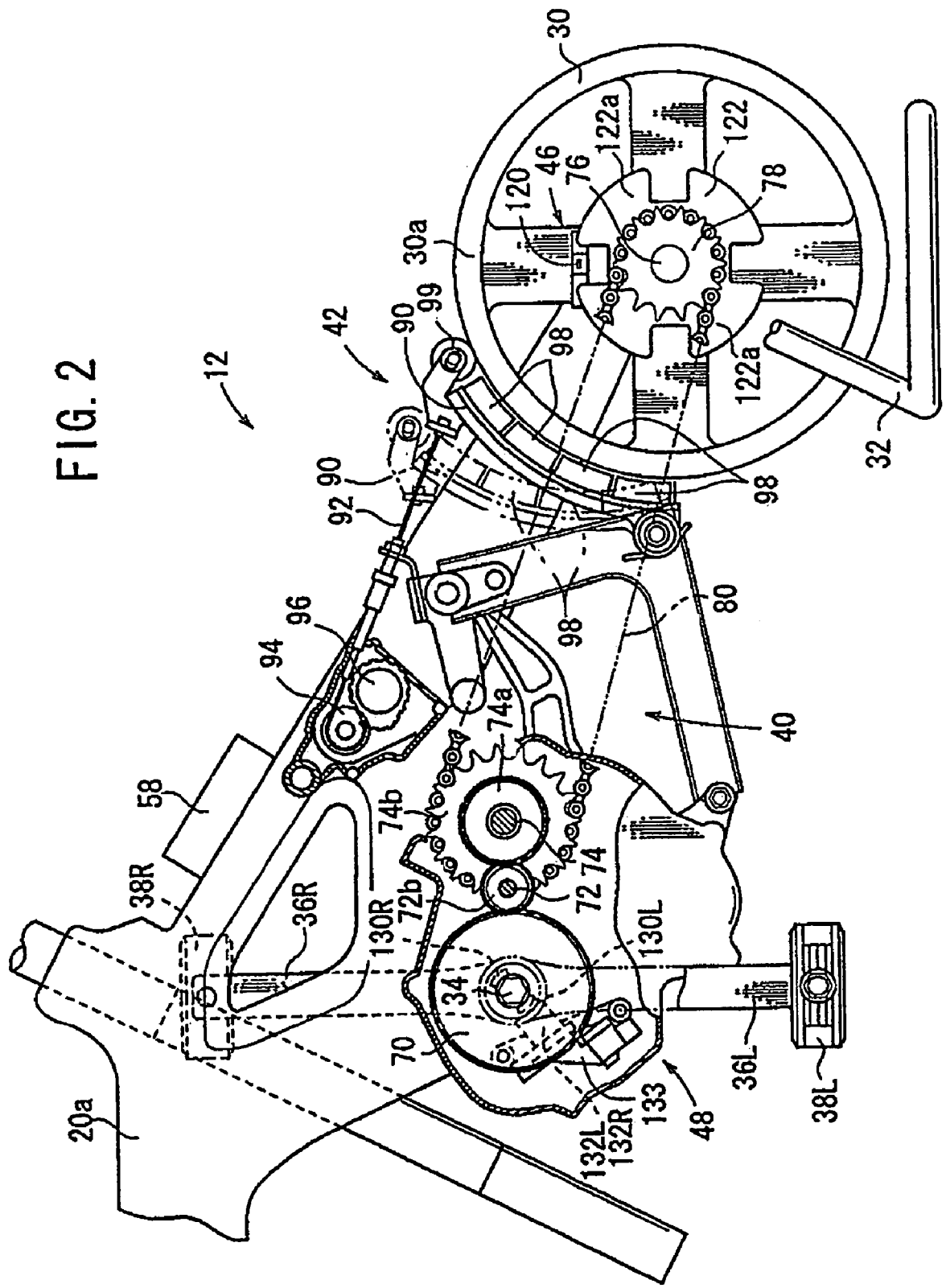
FIG. 2 is a side view showing a partially enlarged cross section of a bicycle simulator.
Figure 4:
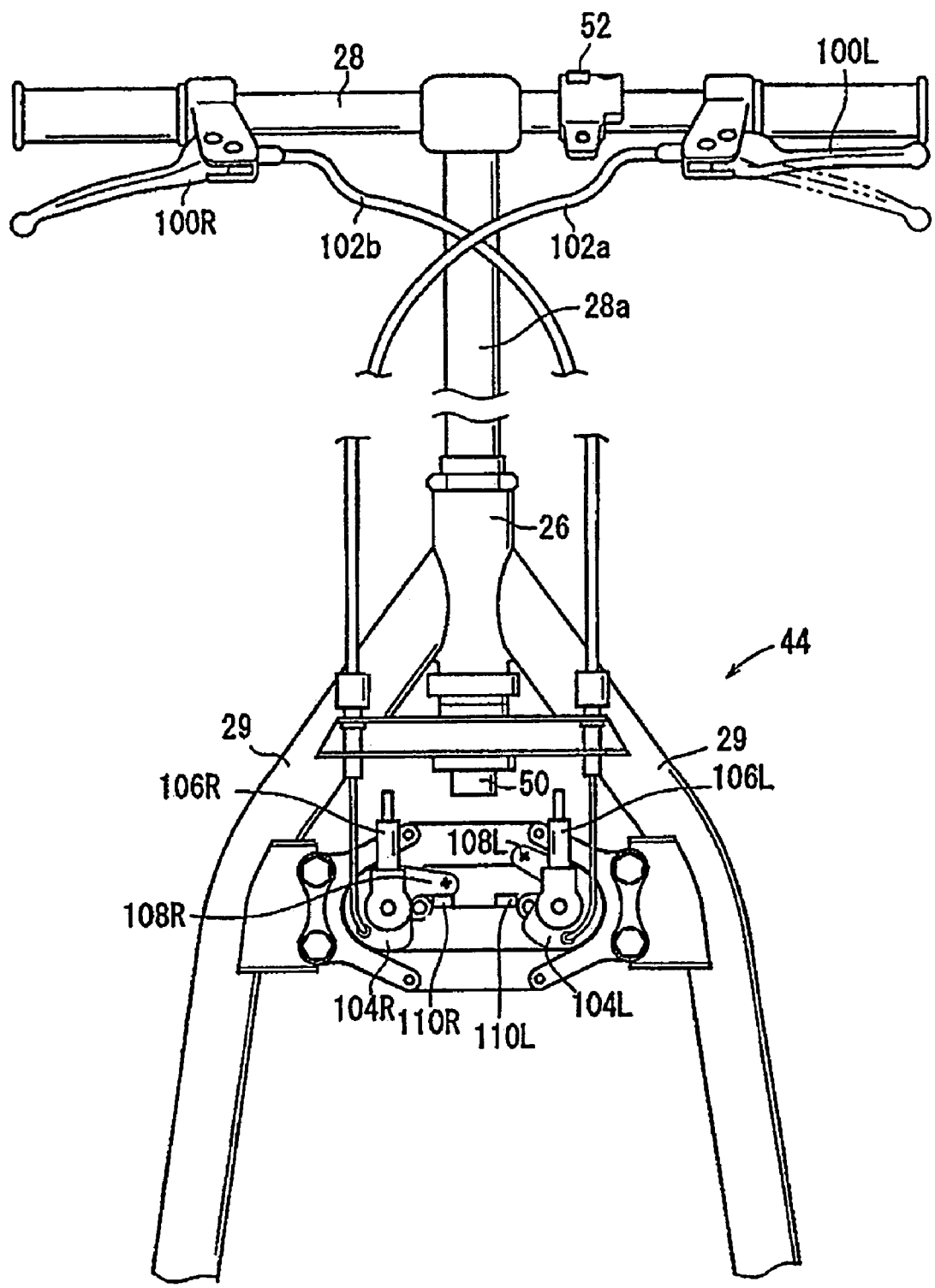
FIG. 4 is a front view of the bicycle simulator.

As shown in FIGS. 1, 2 and 4, the bicycle simulator 12 includes a pair of cranks 36L and 36R which are connected to left and right ends of a crankshaft 34, respectively. Pedals 38L and 38R are provided at respective distal ends of the cranks 36L and 36R, and a driving force transmission section 40 cooperates with the crankshaft 34 so as to transmit the rotation of the crankshaft 34 to the flywheel 30.

Furthermore, the bicycle simulator 12 includes an electric mechanism which comprises a load section 42 which applies a load to the flywheel 30, a braking instruction section 44 for braking the flywheel 30, and a speed detector 46 which detects rotational speed of the flywheel 30. The electric mechanism includes a crank position detector 48 which detects rotational positions of the cranks 36L and 36R, and a steering angle sensor (handlebar operation detector) 50 (see FIG. 4) which detects a steering angle $\theta_H$ of the handlebars 28. The electric mechanism also includes a microphone 52 for inputting voice of the driver, and a grip detector 56 provided underneath the rear of the saddle 24. Moreover, in the bicycle simulator 12, a sub-controller 58 is provided for receiving signals from the above-described electric mechanism and performing a predetermined control. The sub-controller 58 and the main controller 18 can communicate with each other in real time.

Figure 3:
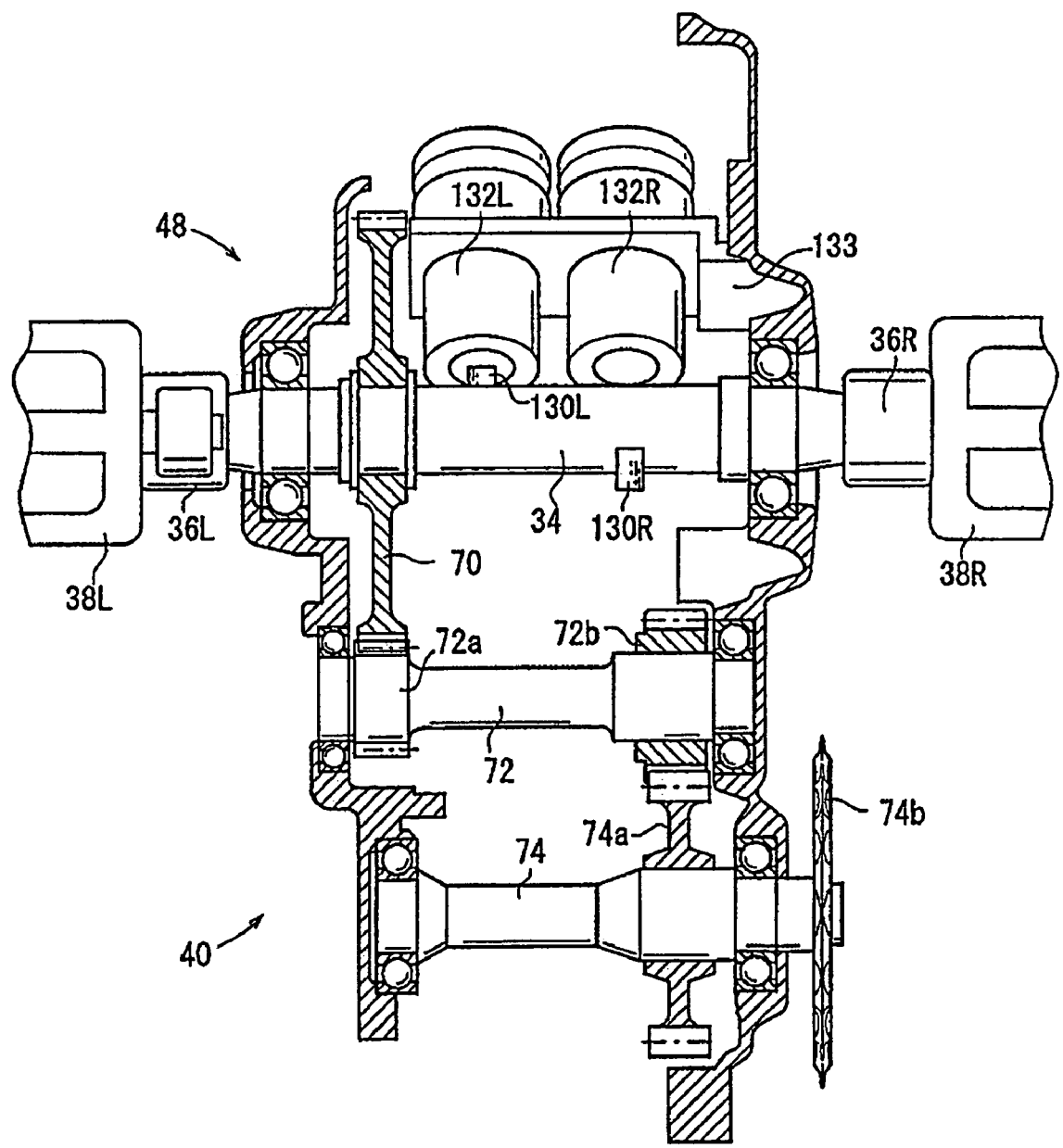
FIG. 3 is a plan view showing a cross section of a driving force transmission section.

As shown in FIGS. 2 and 3, the driving force transmission section 40 includes a driving gear 70 provided on the crankshaft 34, a first intermediate shaft 72 provided with a driven gear 72a and a driving gear 72b, and a second intermediate shaft 74 provided with a driven gear 74a and a driving sprocket 74b. The driving gear 70 is engaged with the driven gear 72a, and the driving gear 72b is engaged with the driven gear 74a. The second intermediate shaft 74 therefore receives driving force of the crankshaft 34 through the first intermediate shaft 72 to be rotated.

The driving force transmission section 40 includes a freehub 76 axially supporting the flywheel 30, a driven sprocket 78 provided for the freehub 76, and a chain 80 transmitting driving force of the driving sprocket 74b to the driven sprocket 78. Each of the crankshaft 34 and first and second intermediate shafts 72 and 74 is pivotally supported by two bearings. The freehub 76 incorporates a bearing.

The freehub 76 transmits, by use of its internal one-way clutch mechanism, only forward rotational driving force of the driven sprocket 78 to the flywheel 30. Therefore, if the crankshaft 34 is rotated backward, or if the rotation of the crankshaft 34 is stopped during forward rotation of the flywheel 30, a rotational state of the flywheel 30 at the time (forward rotation or stop) is maintained regardless of the crankshaft 34.

The load section 42 includes an arc-shaped load plate 90 which has a first end pivotally supported by the frame 20. A pull cable 92 is connected to the opposed, second end of the load plate 90, and is wound on a drum 94. A motor 96 rotates and drives the drum 94. The load plate 90 is provided concentrically with the flywheel 30, and has a plurality of ferrite magnets 98 attached to its inner circumferential surface to face a peripheral rim 30a of the flywheel 30. The load plate 90 is actuated by a torsion spring so as to be tilted toward the flywheel 30. When the pull cable 92 is not pulled, a roller 99, provided at the second end of the load plate 90, comes into contact with the rim 30a and is rotated. In this event, the ferrite magnets 98 and the rim 30a come very close to each other. Accordingly, when the flywheel 30 is rotated, eddy current flows through the rim 30a to cause an eddy current loss. Thus, a load can be applied to the flywheel 30. Applying a load by eddy current enables silent operation with less mechanical noise.

Moreover, winding the pull cable 92 under the operation of the motor 96 causes the load plate 90 to incline, and the ferrite magnets 98 are separated from the rim 30a. Accordingly, the load on the flywheel 30 can be adjusted by the operation of the motor 96. When the load plate 90 is the farthest from the rim 30a, the load becomes substantially zero (0). The load on the flywheel 30 by the load section 42 also acts as braking force, and the load section 42 serves as braking means. The load section 42 does not have a slide section for braking and does not require replacement of parts such as a brake pad, which is required by a type generating a load by means of mechanical braking.

Furthermore, when the pedals 38L and 38R are operated in the case where the assumed gear ratio is high, bringing the load plate 90 close to the rim 30a can cause the driver to provide increased force in order to operate the pedals 38L and 38R, thus achieving gear shift simulation. In this case, when the pedals 38L and 38R are not operated, the load plate 90 is preferably separated from the rim 30a such that unnatural braking is not caused. It is possible to determine whether the pedals 38L and 38R are operated based on signals obtained from left and right approach sensors 132L and 132R.

As shown in FIG. 4, the braking instruction section 44 includes two brake levers 100L and 100R provided on the handlebars 28. Brake wires 102a and 102b extend to the front forks 29 from the handlebars 28. Pulleys 104L and 104R, which can be elastically rotated, are provided, and include rotation sensors 106L and 106R. The brake wires 102a and 102b cross each other at some midpoint thereof, and both ends of the respective wires are connected to the brake levers 100L and 100R and the pulleys 104R and 104L, respectively.

When the brake levers 100L and 100R are not actuated, the pulleys 104L and 104R are elastically urged by springs (not shown) so as to allow protrusions 108L and 108R to be directed upward. In this event, the brake levers 100L and 100R are elastically actuated by the pulleys 104L and 104R and separated from the handlebars 28.

By pulling the brake levers 100L and 100R toward the handlebars 28, the pulleys 104L and 104R are elastically rotated, and the protrusions 108L and 108R are directed downward. The pulleys 104L and 104R can be rotated until the protrusions 108L and 108R come into contact with stoppers 110L and 110R formed on a frame portion extending between the respective forks 29.

Rotation angles of the pulleys 104L and 104R can be detected by the rotation sensors 106L and 106R, and signals representing the detected angle are supplied to the sub-controller 58, respectively. In the sub-controller 58, braking force is applied to the flywheel 30 by controlling the load section 42 based on the detected rotation angle signals of the pulleys 104L and 104R. In other words, braking force is applied to the flywheel 30 by controlling the load section 42 based on signals corresponding to an amount of operation of the brake levers 100L and 100R (hereinafter referred to as brake operation). For example, a load is increased by bringing the load plate 90 closer to the flywheel 30 in proportion to a value obtained by adding the rotation angles of the pulleys 104L and 104R. When this value becomes maximum, the load plate 90 is brought closest to the flywheel 30. When the brake operation is not performed, the load plate 90 is set most distant from the flywheel 30 so as to set the load to sustantially zero (0).

In the braking instruction section 44, the brake operation is converted to electrical signals by the rotation sensors 106L and 106R. Thus, the amount of brake operation can be recognized by the sub-controller 58. The braking instruction section 44 can therefore perform fine processing or adjustments according to the amount of brake operation. Moreover, the electrically driven load section 42 can serve as the brake.

As shown in FIG. 4, the steering angle sensor 50 is provided at the lower end of the head tube 26 and detects the rotation angle of a stem 28a supporting the handlebars 28. The microphone 52 is provided on the handlebars 28. Thus, the microphone 52 is close to the driver's face, and driver's voice can be clearly inputted into the bicycle simulator apparatus 10. The steering angle sensor 50 and microphone 52 are connected to the sub-controller 58 and supply a signal representing the steering angle $\theta_B$ and a voice command signal, respectively, thereto.

Again in FIG. 2, the speed detector 46 includes a speed pickup 120 provided on the frame 20 by use of a bracket, and a pickup rotor 122 which rotates coaxially and integrally with the flywheel 30. The pickup rotor 122 includes four radial blades 122a. The speed pickup 120 detects the rotation speed of the flywheel 30 by sensing each blade 122a as it passes across the front of the speed pickup 120. The flywheel 30 can be regarded as a wheel in an actual bicycle. By detecting the rotational speed of the flywheel 30, a simulated travel speed of the vehicle can be detected. The detection signal emitted from the speed pickup 120 is supplied to the sub-controller 58.

Figure 5:
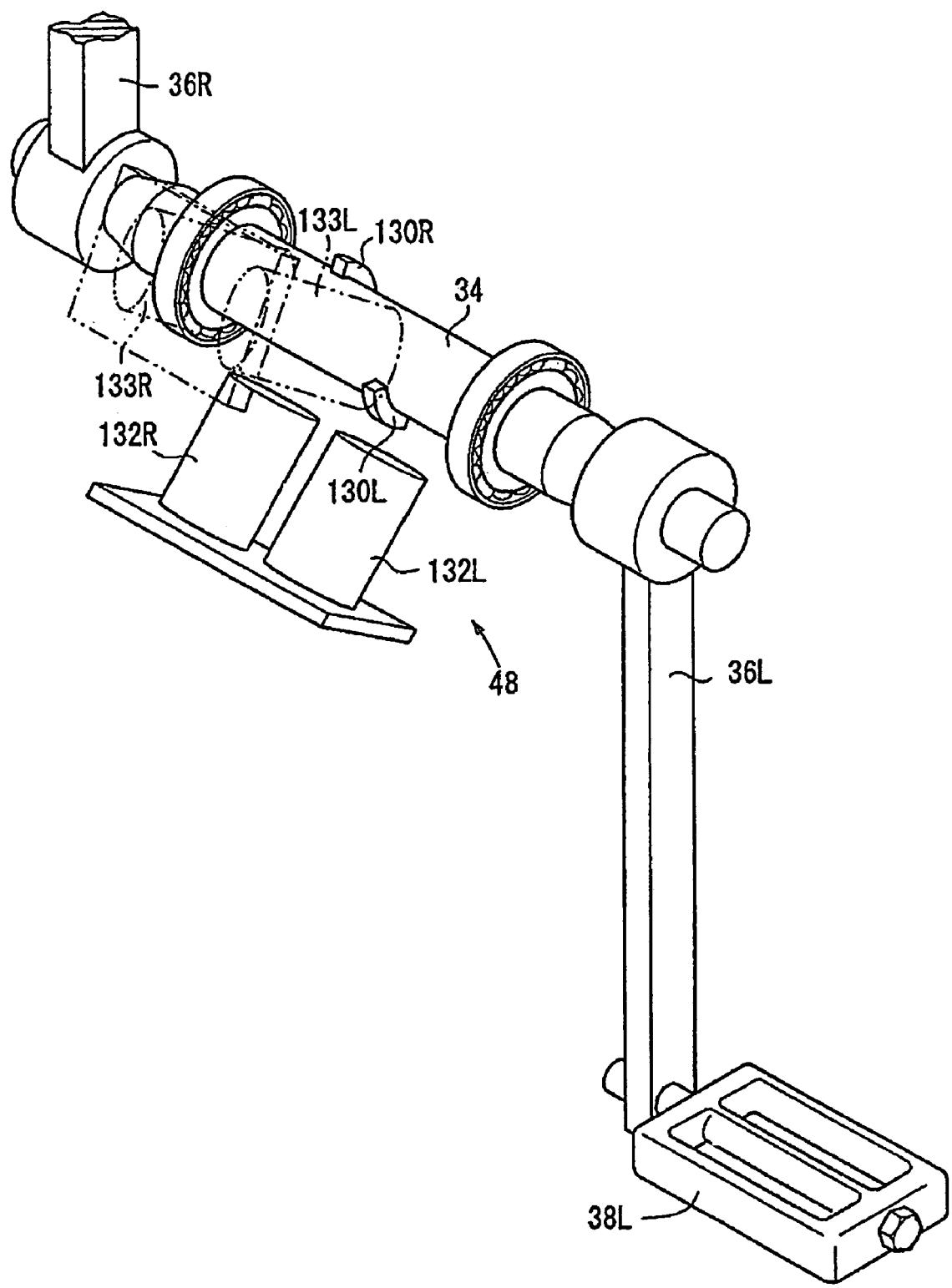
FIG. 5 is a schematic perspective view of the driving force transmission section.

As shown in FIGS. 2, 3, and 5, the crank position detector 48 includes detected protrusions 130L and 130R which are provided on the left and right sides of the crankshaft 34 at equal distances from the center of the crankshaft 34. The crank position detector further includes the left and right approach sensors 132L and 132R. The left and right approach sensors 132L and 132 R are provided in the vicinity of the crankshaft 34 by means of a stay 133, and are arranged in such a manner that the respective detected protrusions 130L and 130R pass near the fronts of the respective detecting portions as the crankshaft 34 rotates. The left and right approach sensors 132L and 132R may be directly attached to the frame 20 or a predetermined casing.

The left and right approach sensors 132L and 132R are, for example, sensors using Hall elements, and are activated when the detected protrusions 130L and 130R as detected matters are positioned in front of the respective detection portions. By using the left and right approach sensors 132L and 132R for the crank position detector 48, rotational positions of the cranks can be easily detected using a low-cost configuration.

The detected protrusions 130L and 130R are protrusions that extend circumferentially 60 degrees in a fan-like form around the crankshaft 34. When the crank 36L is directed downward and the crank 36R is directed upward, the detected protrusion 130L is attached so as to be directed at a 45 degree angle clockwise from the vertically downward position in FIG. 2 (hereinafter referred to as the base angle), and the detected protrusion 130R is attached so as to be directed at a 180 degree angle from the base angle.

The left and right approach sensors 132L and 132R are provided at such positions that the detected protrusions 130L and 130R can be detected at the base angle, respectively. Specifically, during rotation of the crankshaft 34, the left approach sensor 132L is turned on when the center of the detected protrusion 130L is in plus/minus 30 degrees from the base angle and otherwise is turned off. On the other hand, during rotation of the crankshaft 34, the right approach sensor 132R is turned on when the center of the detected protrusion 130R is in plus/minus 30 degrees from the base angle and otherwise is turned off. In other words, when the left crank 36L and pedal 38L are in plus/minus 30 degrees from the downward direction, the left approach sensor 132L is turned on. When the right crank 36R and pedal 38R are in plus/minus 30 degrees from the downward direction, the right approach sensor 132R is turned on. The on/off signals detected by the left and right approach sensors 132L and 132R are supplied to the sub-controller 58.

Moreover, as indicated by broken lines in FIG. 5, a left approach sensor 133L which detects the detected protrusion 130L and a right approach sensor 133R which detects the detected protrusion 130R may be provided in positions at 90 degrees clockwise from the base angle. Accordingly, when the left approach sensor 133L is turned on, it is possible to detect that the crank 36L is horizontally directed forward, and when the right approach sensor 133R is turned on, it is possible to detect that the crank 36R is horizontally directed forward. Thus, for example, an image of the cranks of the bicycle and of feet of the driver, which are displayed on the screen 14a, can be changed in stages according to actual angles of the cranks 36L and 36R and can be shown in animation. Consequently, more realistic image is generated, and obtained by the driver.

Figure 6:
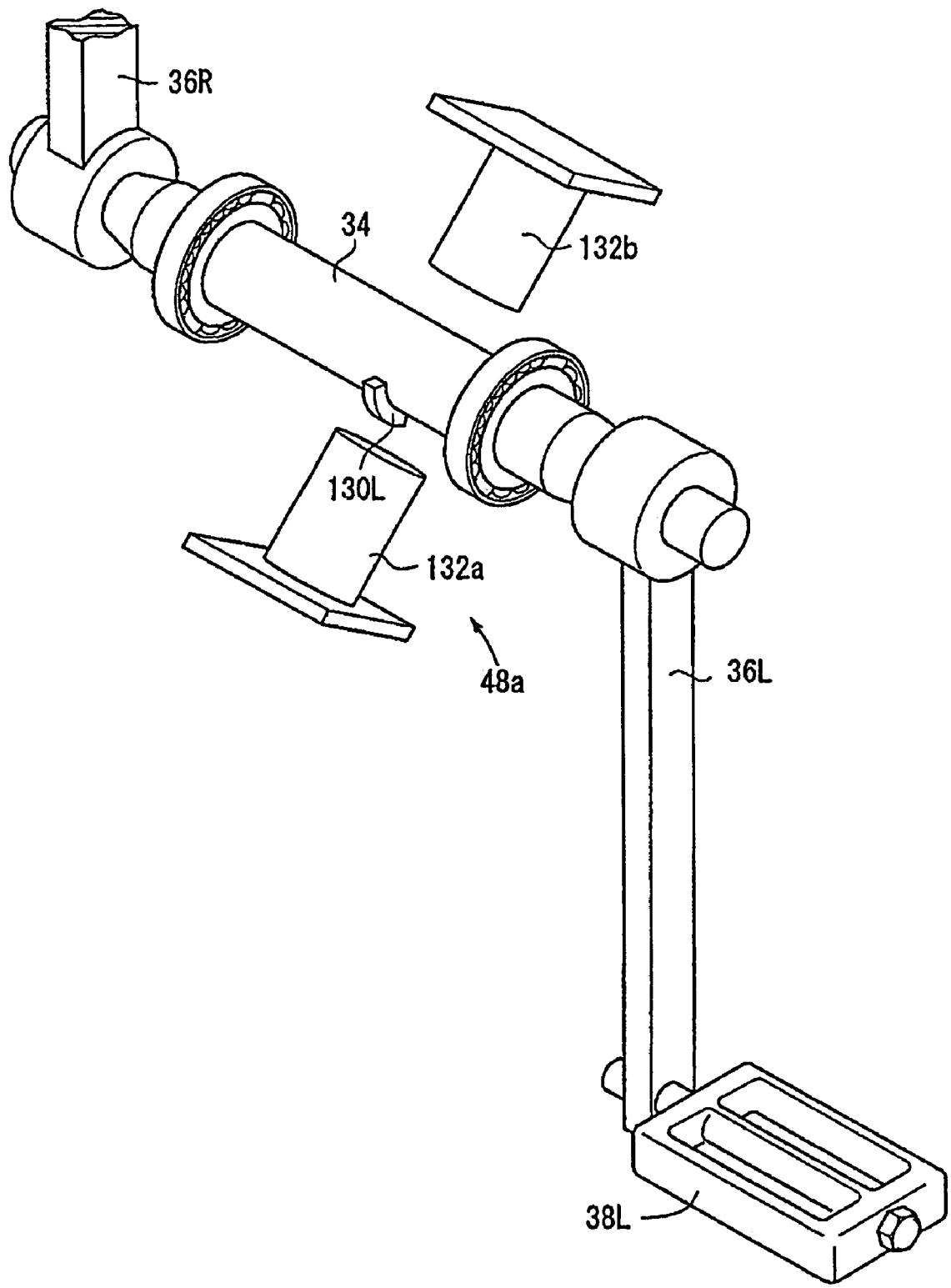
FIG. 6 is a schematic perspective view of a modified example of the driving force transmission section.

Furthermore, a modified crank position detector 48a is shown in FIG. 6. According to this modified example, the detected protrusion 130R may be omitted, and one detected protrusion 130L and two approach sensors 132a and 132b may be provided. In addition, the approach sensors 132a and 132b may be provided opposite to each other across the crankshaft 34. In this case, it is possible to detect that, when the approach sensor 132a corresponding to the left approach sensor 132L detects the detected protrusion 130L and is turned on, the left crank 36L is directed downward, and that, when the approach sensor 132b corresponding to the right approach sensor 132R detects the detected protrusion 130L and is turned on, the right crank 36R is directed downward. Furthermore, an alternative crank position detector may be provided. For example, an alternative crank position detector is a rotation sensor such as a rotary encoder which minutely detects the rotation angle of the crankshaft 34.

Figure 7:
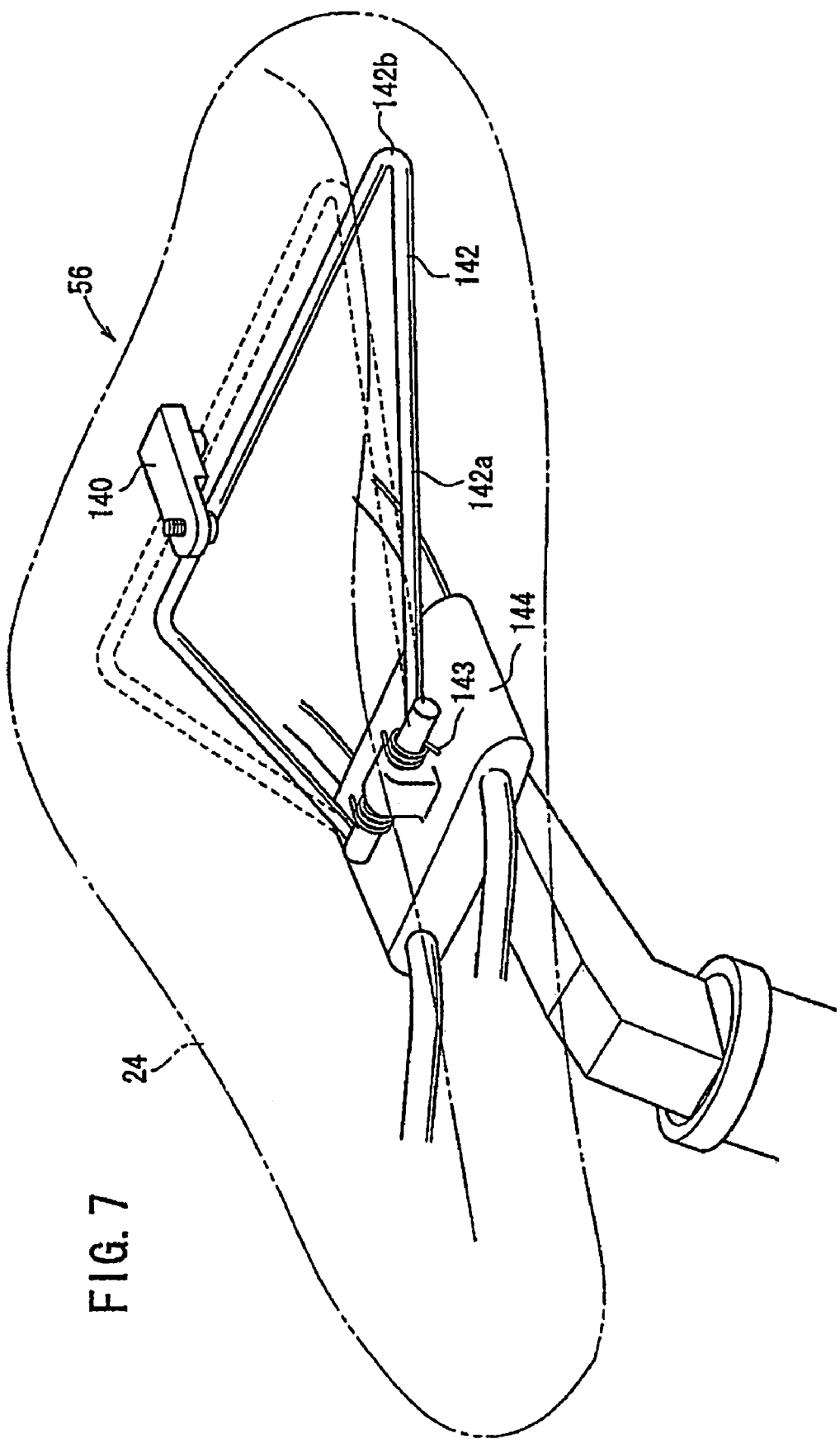
FIG. 7 is a perspective view showing a main portion of a saddle.

As shown in FIG. 7, the grip detector 56 includes a reverse switch 140. Reverse switch 140 is a momentary limit switch provided under a rear portion of the saddle 24. The grip detector 56 also includes a lever 142 for operating the reverse switch 140 on/off.

A front portion 142a of the lever 142 is elastically urged downward by springs 143 and is pivotally supported on the saddle supporting unit 144. The front portion 142a abuts on a predetermined stopper. A rear portion 142b of the lever 142 has a plate shape with a substantially same width as that of a rear portion of the saddle 24, and is disposed below the reverse switch 140. The lever 142 is manually operated, and can be raised upward when a moderate reaction force is applied to the springs 143. The lever 142 is raised until the rear portion 142a comes into contact with the reverse switch 140. The reverse switch 140 is thereby turned on, and the on signal is supplied to the sub-controller 58. The lever 142 is operated when the driver is off the vehicle and is operated such that the rear portion 142b and the rear upper portion of the saddle 24 are grasped together.

Since the reverse switch 140 is operated through the lever 142, the driver, when dismounted from the bicycle simulator 12, can easily operate the reverse switch 140. Moreover, since the reverse switch 140 is operated through the lever 142, the rear portion 142b, which is the operating portion of the lever 142, can be disposed at a position which is most easily reached by the hand of the driver. Moreover, the size and shape of the reverse switch 140 and the number thereof are selected with a great degree of design freedom.

Because the grip detector 56 is provided under the rear portion of the saddle 24, the grip detector 56 does not become an obstacle when the driver is sitting on the saddle 24 and during operation of the pedals 38L and 38R.

Since the reverse switch 140 is operated through the lever 142, the driver, when dismounted from the bicycle simulator 12, can easily operate the reverse switch 140. Moreover, reverse switch 140 may be of small size. The grip detector 56 is provided under the rear portion of the saddle 24, thus is not an obstacle for the driver when sitting on the saddle 24.

As shown in FIG. 1, the mat switch 16 is composed of a left switch 150L and a right switch 150R. The left switch 150L and the right switch 150R are independent of each other and are arranged at such positions that the driver can step on the mat switch 16 when the driver dismounts. Specifically, the driver can step on the respective left and right switches 150L, 150R by straddling the front tube 20a of the frame 20. More specifically, when the driver gets off the bicycle simulator 12 by straddling front tube 20a, the left foot steps on the left switch 150L, and the right foot steps on the right switch 150R. The left and right switches 150L, 150R are turned on by the driver stepping thereon, and the resulting signals are supplied to the sub-controller 58.

Figure 8:
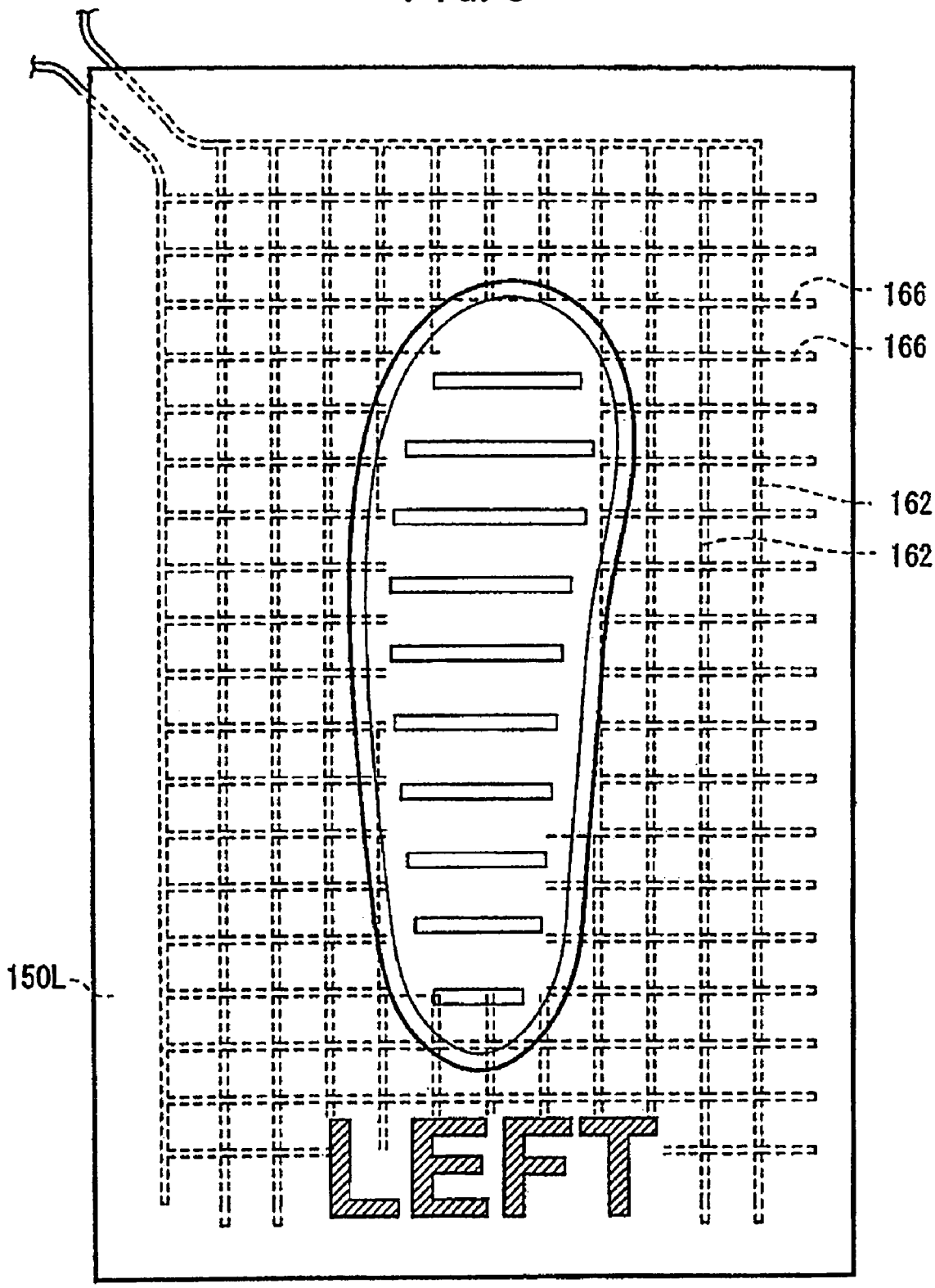
FIG. 8 is a plan view of a left driver sensing switch.
Figure 9:
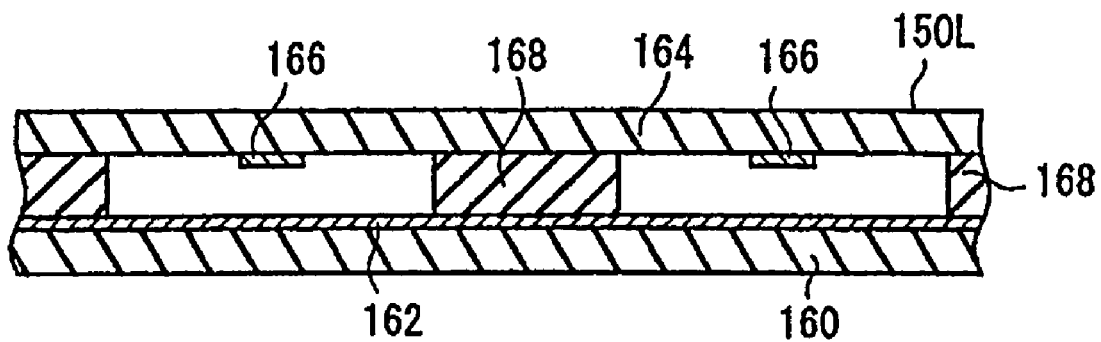
FIG. 9 is a cross-sectional view of the left driver sensing switch.

As shown in FIGS. 8 and 9, the left switch 150L is in the form of a thin mat and includes a rear rubber sheet 160. A plurality of longitudinal electrode lines 162 are attached to an inner surface of the rear rubber sheet 160. The left switch 150L also includes a front rubber sheet 164. Transverse electrode lines 166 attached to an inner surface of the front rubber sheet 164. An insulating material 168 is provided between the longitudinal electrode lines 162 and the transverse electrode lines 166. Each of the longitudinal electrode lines 162 is connected to one of two terminals (not shown), and each of the transverse electrode lines 166 is connected to the other of the two terminals. The front rubber 164 and the insulating material 168 are soft and elastically deformed by a foot stepping on the front rubber 164. In this event, the longitudinal electrode lines 162 and the transverse electrode lines 166 come into contact with each other at intersections thereof. Thus, the two terminals are electrically connected to each other to turn on the switch. Meanwhile, when the driver lifts his/her foot, the front rubber 164 and the insulating material 168 are restored to their original shapes, and the longitudinal electrode lines 162 and the transverse electrode lines 166 are separated from each other. Accordingly, the switch is turned off. On outer surface of the front rubber 164, a pattern of the left foot and letters "LEFT" are printed. The right switch 150R has the same structure as that of the left switch 150L, and, on the outer surface thereof, a pattern of the right foot and letters "RIGHT" are printed.

As described above, the left and right switches 150L and 150R are pressure-sensitive switches which sense a load of the driver's feet. However, alternative switches may be employed, including, but not limited to, temperature-sensitive, infrared, optical or capacitance-type switches, as long as the switches are capable of sensing landing of the driver's feet.

Figure 10:
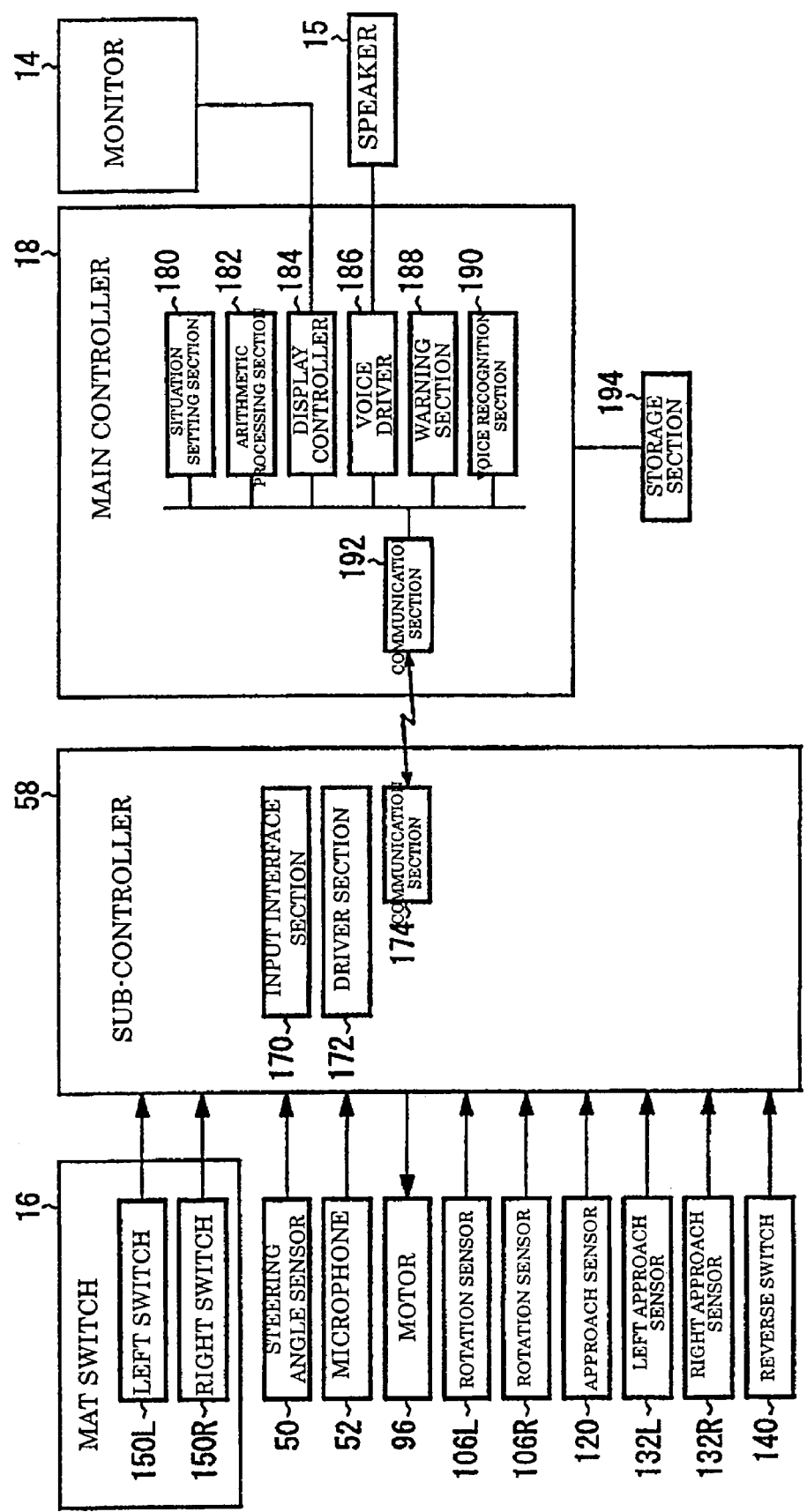
FIG. 10 is a block diagram showing an electrical configuration of the bicycle simulation apparatus.

As shown in FIG. 10, the sub-controller 58 includes an input interface section 170, a driver section 172, and a first communication section 174, and mainly serves as an interface between the electric mechanisms of the bicycle simulator 12 and the main controller 18. The input interface section 170 is connected to the microphone 52 and the various sensors described above, and receives analog signals and digital signals. The driver section 172 controls the motor 96. The first communication section 174 exchanges various types of data with the main controller 18.

The main controller 18 includes a situation setting section 180 setting a situation of driving simulation and an arithmetic processing section 182 performing arithmetic processing according to a driving situation. The main controller 18 also includes a display controller 184 controlling display of the monitor 14, a sound driver 186 performing voice output via the speakers 15, and a warning section 188 giving predetermined warnings to the driver. The main controller 18 further includes a voice recognition section 190 recognizing voice commands inputted from the microphone 52, and a second communication section 192 controlling communication with the first communication section 174.

The main controller 18 includes a CPU (Central Processing Unit) mainly for control, and a ROM (Read Only Memory), a RAM (Random Access Memory), an HD (Hard Disk), and the like as storage units. The CPU reads a program recorded on the HD and executes the program in cooperation with the ROM, the RAM, and predetermined hardware to implement each functional section of the main controller 18 shown in FIG. 10. The main controller 18 is connected to a large capacity storage section 194 and can write and read various types of data.

Figure 11:
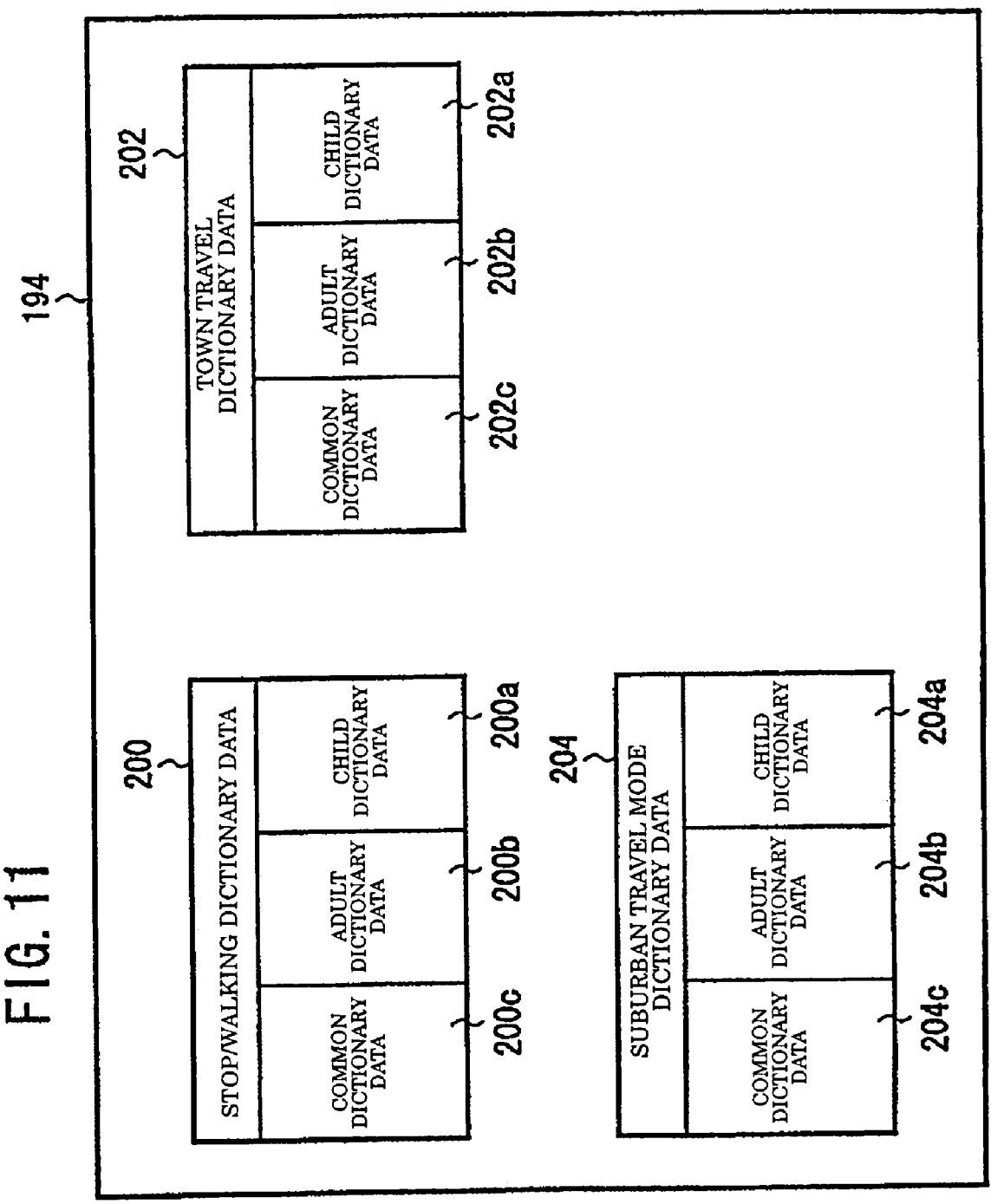
FIG. 11 is an explanatory view showing classification of dictionary data recorded in a storage section.

As shown in FIG. 11, in the storage section 194, three types of dictionary data corresponding voice commands are recorded for voice recognition. The voice commands are related to the later-described simulation modes of walking, walking back, and travel. Specifically, the storage section 194 includes stop/walking dictionary data 200 used in modes other than the travel mode, town travel dictionary data 202 used in a situation of traveling in a town in the travel mode, and suburban travel dictionary data 204 used in a situation of traveling in the suburbs in the travel mode. The stop/walking dictionary data 200 is composed of child dictionary data 200a used when the driver is a child, adult dictionary data 200b used when the driver is an adult, and common dictionary data 200c used for children and adults in common. Similarly, the town travel dictionary data 202 is composed of child dictionary data 202a, adult dictionary data 202b, and common dictionary data 202c, and the suburban travel dictionary data 204 is composed of child dictionary data 204a, adult dictionary data 204b, and common dictionary data 204c.

In each of the respective stop/walking dictionary data 200, town travel dictionary data 202, and suburban travel dictionary data 204 (hereinafter, collectively referred to also as dictionary data), pieces of phrase data are recorded. Editing, such as addition and deletion of the phrase data, can be performed by using predetermined procedures. Although the respective dictionary data are disclosed herein as classified into those for children and those for adults, the data may be classified using other criteria, such as by language (for example, Japanese and English).

As shown in FIG. 12, the town travel dictionary data 202 is composed of command fields 206 and process fields 208. The respective fields are divided for the child dictionary data 202a, the adult dictionary data 202b, and the common dictionary data 202c, and the respective data is stored therein.

In command fields 206a of the child dictionary data 202a, phrase data including "up," "down," "back," "heavy," and "light," and the like are recorded. In the process fields 208 corresponding to these phrase data, processes to be implemented based on the phrase data are recorded. Specifically, a process corresponding to "up" is "bird's eye view display" and indicates that the scene from a bird's eye point of view is displayed on the screen 14a. A process corresponding to "down" is "driver's view display" and indicates that the scene from the driver's own point of view is displayed on the screen 14a. A process corresponding to "heavy" is "increase load/increase speed coefficient" and indicates that the load on the flywheel 30 is increased and the speed coefficient for calculating simulated speed is increased. A process corresponding to "light" is "reduce load/reduce speed coefficient" and indicates that the load on the flywheel 30 is reduced and the speed coefficient is reduced.

In command fields 206b of the adult dictionary data 202b, phrase data including "bird's eye point of view," "driver's point of view," "upshift," "downshift," and the like are recorded. The respective phrase data are set and recorded so as to perform the same processes of "up," "down," "heavy," and "light" of the child dictionary data 202a.

In command fields 206c of the common dictionary data 202c, phrase data including "left" and "right" are recorded. A process corresponding to "left" is "left side screen display" and indicates that an image of a view to the left from the driver at that time is displayed on the screen 14a. A process corresponding to "right" is "right side screen display" and indicates that an image of a view to the right from the driver at that time is displayed on the screen 14a.

The stop/walking dictionary data 200 and the suburban travel dictionary data 204 have the same format as that of the town travel dictionary data 202. In the stop/walking dictionary data 200 and suburban travel dictionary data 204, processes necessary for stop/walking and processes necessary for suburban travel are recorded, respectively, and phrase data for implementing these processes are recorded. Among these, in the stop/walking dictionary data 200, although portions of the phrase data described above, such as "left" and "right" are recorded, other portions of the phrase date, such as "heavy," "light," "upshift," and "downshift", unnecessary for stop and walking, are not recorded.

Figure 27:
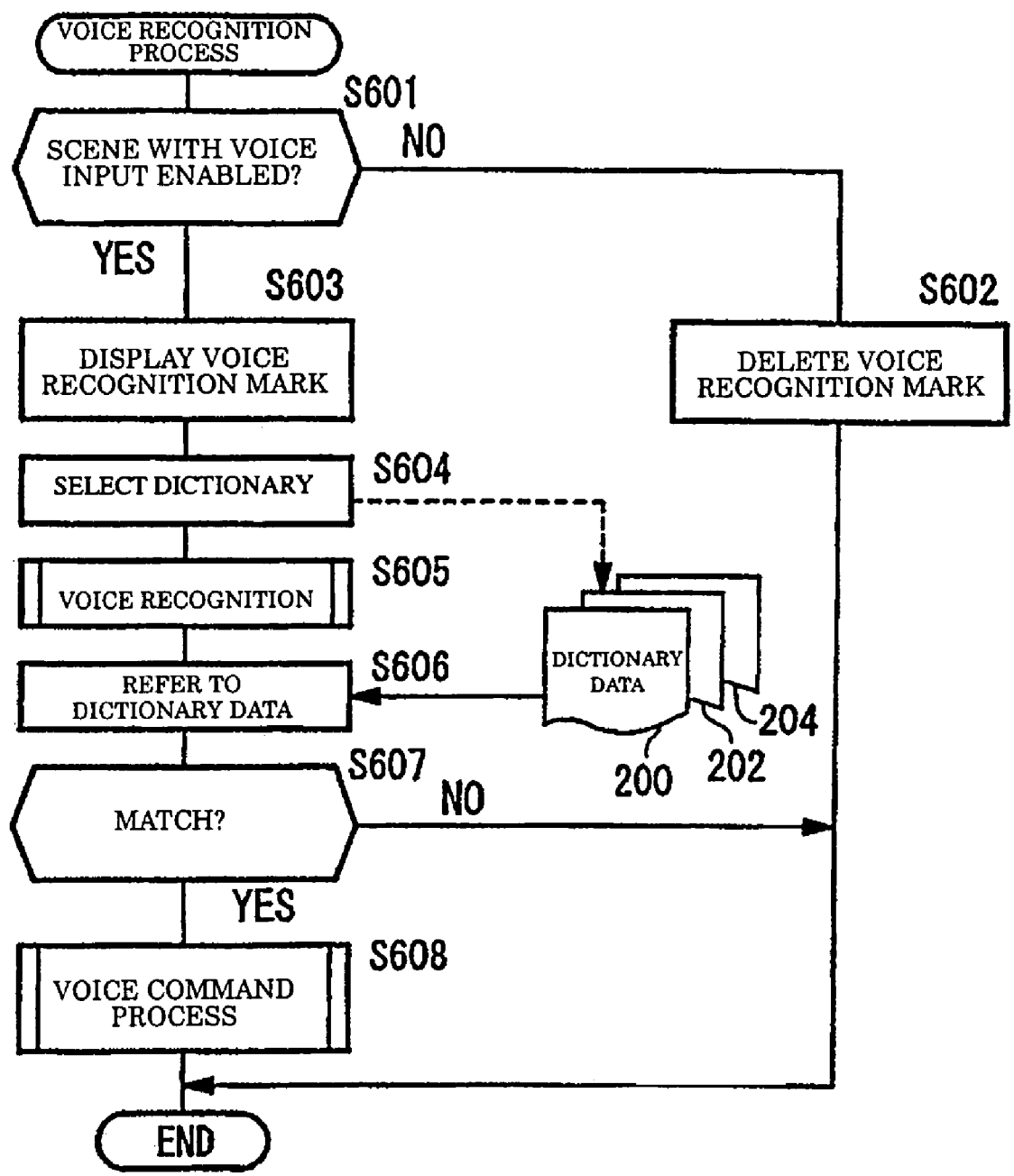
FIG. 27 is a flowchart showing contents of a voice recognition process.

Note that the stop/walk dictionary data 200, the town travel dictionary data 202, and the suburban travel dictionary data 204 are also referred to as voice filters because these dictionary data operate by receiving recognized driver's voice command and output a predetermined auditory command process (see FIG. 27).

Next, with reference to FIGS. 13 to 27, a method for performing driving simulation of a bicycle by use of the bicycle simulation apparatus 10, having the configuration as described above, will be described. The following description relates to processes implemented by the main controller 18 and the sub-controller 58 in cooperation with each other after the both controllers are started by turning on a predetermined power switch. In the following description, process of the main controller 18 and process of the sub-controller 58 are not discriminated from each other. Moreover, the processes are implemented in the order of the designated step numbers unless otherwise noted.

Figure 13:
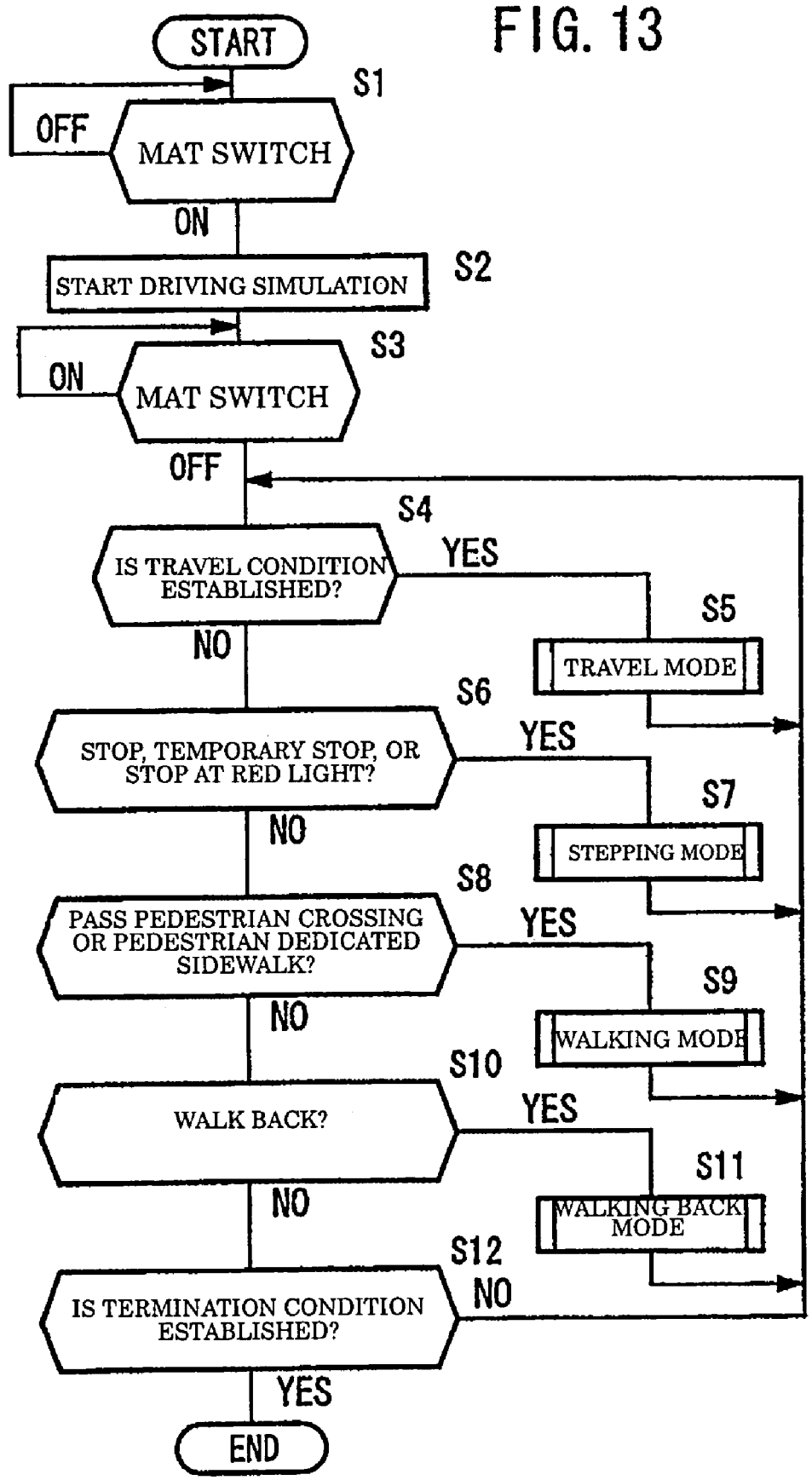
FIG. 13 is a flowchart showing a main routine of a method for performing driving simulation of a bicycle by use of the bicycle simulation apparatus.
Figure 14:
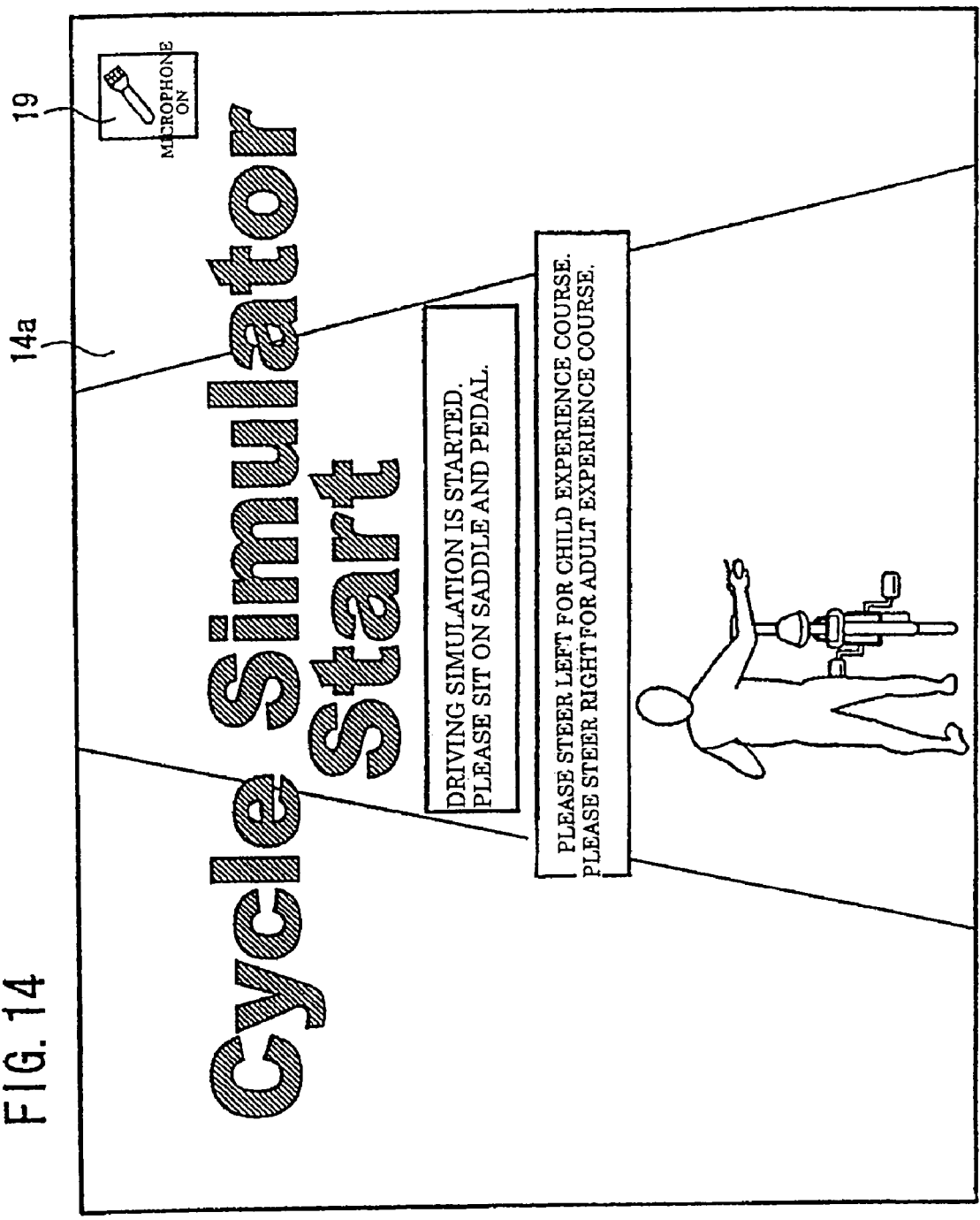
FIG. 14 is a view showing a start screen.

In step S1 of FIG. 13, it is checked whether the mat switch 16 is turned on. Specifically, when at least one of the left and right switches 150L and 150R of the mat switch 16 is turned on, the apparatus 10 proceeds to step S2, and when both switches are off, the apparatus 10 stands by at step S1. In other words, when the driver stands on the mat switch 16, the apparatus 10 automatically proceeds to step S2. The apparatus 10 can be configured to stand by at step S1 and remain in a predetermined power saving mode (for example, the monitor 14 is turned off) until the mat switch 16 is activated.

In step S2, a driving simulation is started, and a predetermined start screen (see FIG. 14) is displayed on the screen 14a. In this start screen, an image of a stopped bicycle and an image of a person as the driver standing beside the bicycle are displayed. In addition, a phrase such as "Driving simulation is started. Please sit on the saddle and pedal." is displayed on the screen 14a, and/or a verbal command speaking the same words is outputted from the speakers 15 (hereinafter, collectively referred to as "provide an instruction"). Furthermore, an instruction "Please steer left for child experience course. Please steer right for adult experience course." is provided, in visual and/or verbal form.

As described above, the driving simulation can be automatically started by stepping on the mat switch 16. Accordingly, the driving simulation can be comfortably started without a complicated operation. Moreover, the driver may easily perform operations according to the instructions given from the screen 14a or speakers 15. Thus, easy operation of the simulator 10 is possible without a manual or the like, and even a child can perform the driving simulation.

In step S3, it is checked whether the mat switch 16 is turned off. Specifically, when both the left and right switches 150L and 150R are turned off, the apparatus 10 proceeds to step S4. When at least one of the switches is turned on, the apparatus 10 stands by at step S3.

In other words, when the driver sits on the saddle 24 and takes his/her feet off the mat switch 16, the apparatus 10 automatically proceeds to step S4, and actual travel within the driving simulation can be started. At this time, the aforementioned start screen is terminated, and the images of the bicycle and the person riding on the bicycle are displayed.

During initial simulated travel, when the handlebars 28 are recognized to be steered left based on the signal of the steering angle sensor 50, it is judged that the child experience course is selected and the driver is a child. When the handlebars 28 are recognized to be steered right, it is judged that the adult experience course is selected and the driver is an adult. Predetermined flags according to the individual courses are then set within the controller 18.

In step S4, it is checked whether a predetermined travel condition is established. When the travel condition is established, the apparatus 10 proceeds to step 5, in which a travel mode is simulated. When the travel condition is not established, the apparatus 10 proceeds to step S6.

In step S6, it is checked whether the driving simulation corresponds to a situation of a stop, a temporary stop or a red light. In the case of the stop, temporary stop or red light, the apparatus 10 goes into a stepping mode in step S7, and otherwise proceeds to step S8.

In step S8, it is checked whether the driving simulation corresponds to a situation of going through a pedestrian priority road such as a pedestrian crossing or on a pedestrian dedicated road such as a sidewalk. In the case of simulation of going through the pedestrian priority road or on the pedestrian dedicated road, the apparatus 10 goes into a walking mode in step S9, and otherwise proceeds to step S10.

In step S10, it is checked whether the driving simulation corresponds to a situation of walking the bicycle back to a previous location. In the case of walking the bicycle back to a previous location, the apparatus 10 proceeds to Step 11 in which it goes into a walking back mode. Otherwise, the apparatus proceeds to step S12.

In step S12, it is judged whether a predetermined termination condition is established. When the termination condition is established, the driving simulation is terminated. When the condition is not established, the apparatus 10 returns to step S2, and the driving simulation is continued. After the respective processes in each of the steps S5, S7, S9 and S11 are terminated, the apparatus 10 also returns to step S2.

In the case of terminating the driving simulation, similarly to the above step S1, it is checked whether the mat switch 16 is turned on. In this case, by the turning on of the mat switch 16, it is possible to detect that the driver has dismounted from the bicycle simulator 12. The driving simulation is terminated based on this, and the apparatus 10 returns to a standby state, such as the predetermined power saving mode. In the above step S2, in which the driving simulation is started, when the bicycle simulator 12 is not operated at all for a predetermined period of time after the mat switch 16 is turned off, it is assumed that the driver stepped once on the mat switch 16, but did not ride the bicycle simulator 12. In this situation, the apparatus 10 is also returned to a standby state.

Next, the travel mode is described. The travel mode is a mode in which the driver is operating the pedals 38L and 38R and steering the handlebars 28 while sitting on the saddle 24 and viewing a travel simulation.

Figure 15:
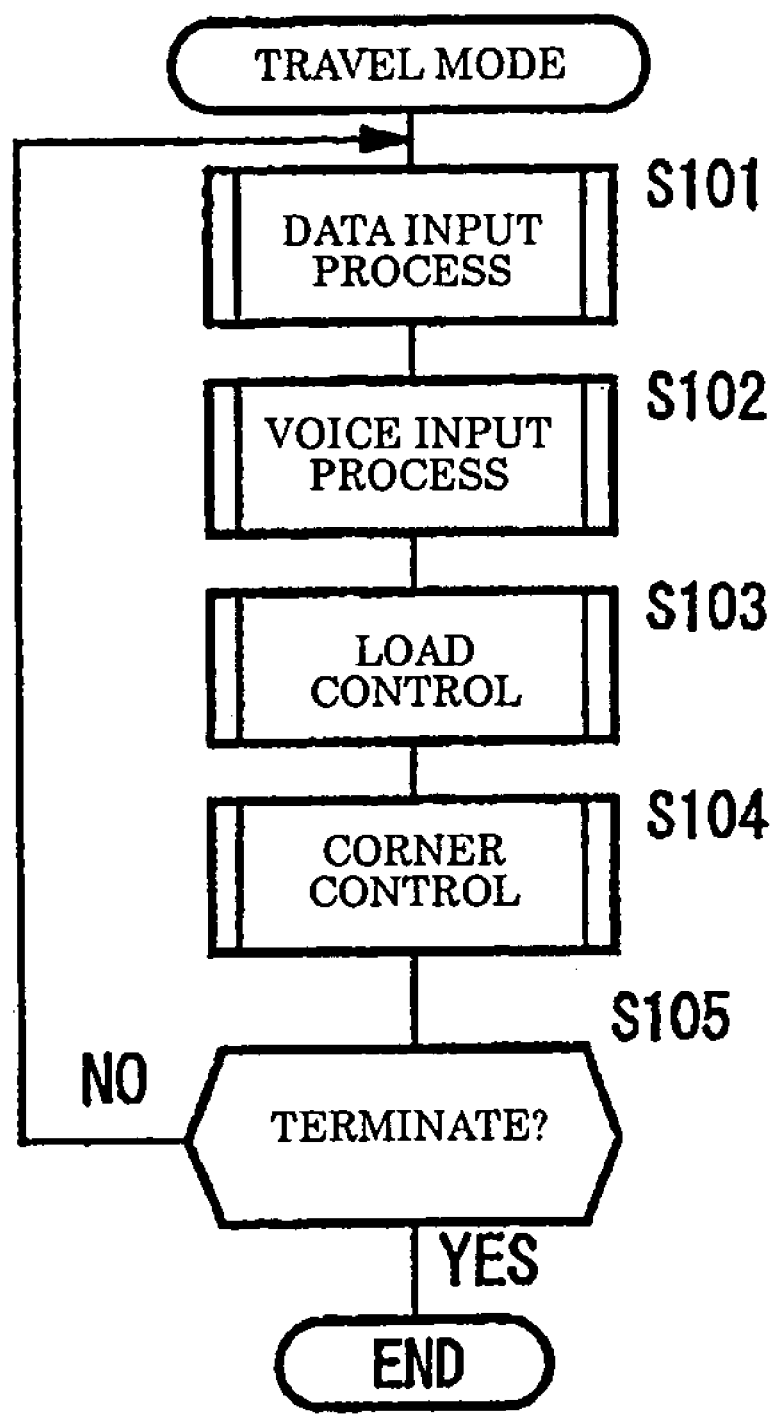
FIG. 15 is a flowchart of a travel mode.

As shown in FIG. 15, when the simulation proceeds to the travel mode per Step S5 in FIG. 13, the following steps are executed. First, in Step S101, a data input process is performed. In this input process, signals of the steering angle sensor 50, the rotation sensors 106L and 106R, the speed pickup 120, the left approach sensor 132L, the right approach sensor 132R, and the reverse switch 140 are read. Among those signals, analog signals are subjected to predetermined A/D conversion, and digitized data is read.

Moreover, in this input process, data inputted from the speed pickup 120 is FV converted to obtain a simulated travel speed V. In this event, if an assumed gear ratio is high, the travel speed V is obtained by multiplying a rotational speed of the flywheel 30, which is obtained by FV conversion, by a speed coefficient of not less than 1.0 corresponding to the gear ratio.

Figure 17:
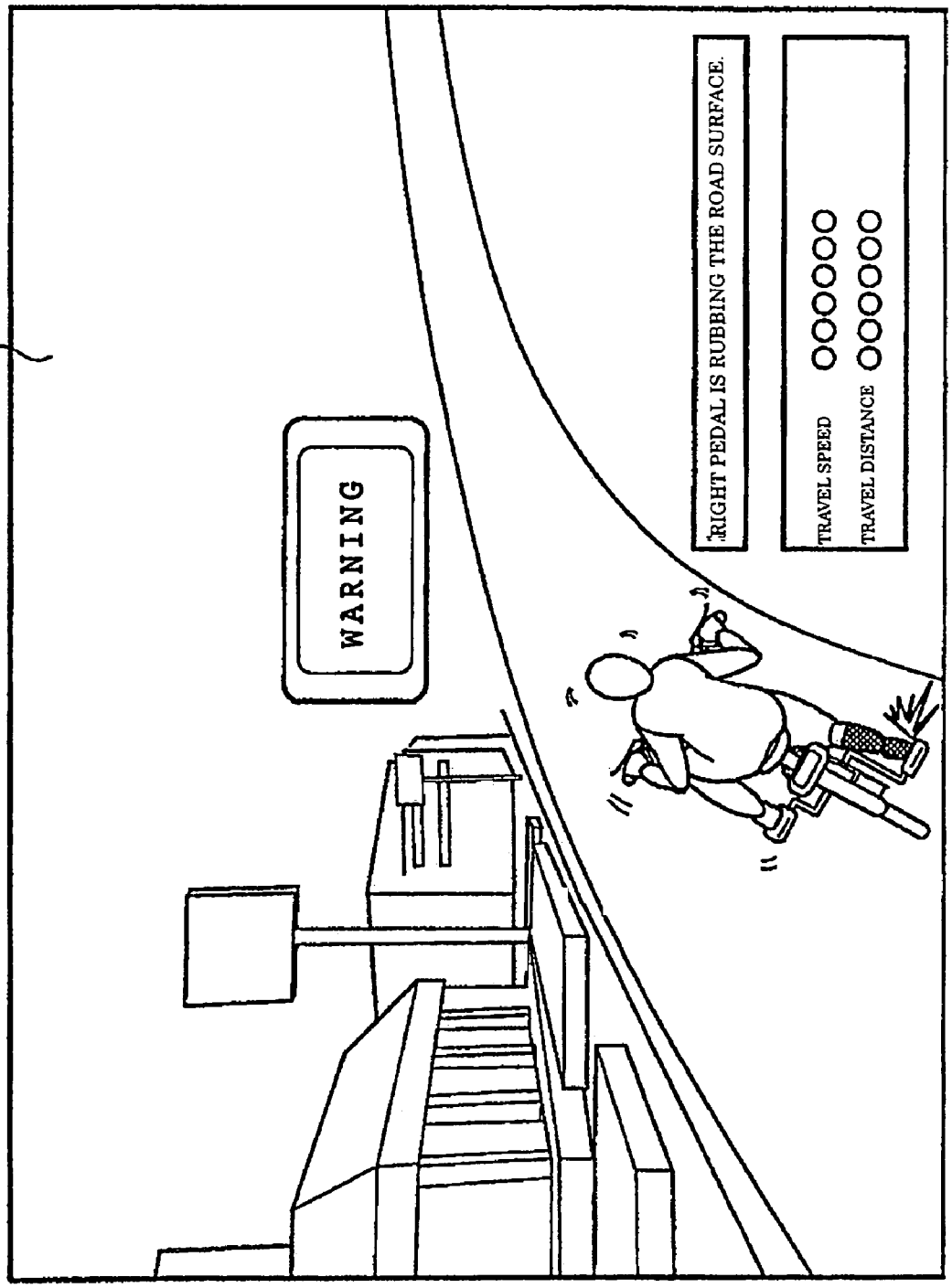
FIG. 17 is a screen display showing a warning during corner traveling.

Furthermore, a travel distance, a maximum speed, an average speed, a travel time and the like may be obtained as needed and displayed on the screen 14a (see FIG. 17). Still furthermore, a rotational speed of the crankshaft 34 may be obtained as needed by use of the left and right approach sensors 132L and 132R, and displayed on the screen 14a. If an image is displayed by changing a rotational speed of the feet of the driver on the screen 14a according to the crankshaft rotational speed, a more realistic image can be obtained. It is physically important to maintain a proper value of the crankshaft rotational speed in a long-distance travel of the bicycle. Display of the crankshaft rotational speed on the screen 14a is suitable for the purpose of training.

The travel speed V is not necessarily obtained by the speed detector 46, and may be one based on parameters generated by working the pedals 38L and 38R of the driver. For example, the travel speed V may be estimated from the crankshaft rotational speed and the signals of the rotation sensors 106L and 106R indicating the amount of brake operation.

In Step S102, a voice input process is performed under the operation of the voice recognition section 190, and voice of the driver, which is inputted from the microphone 52, is recognized. The details of this voice input process will be described later.

In Step S103, load control is performed for the flywheel 30. In this load control, if the driving simulation is simulating acceleration or an upward climb, the load is increased. On the other hand, during simulations of traveling on a flat road or traveling downward, the load is reduced. Moreover, the load is increased approximately in proportion to a value obtained by adding the signal of the rotation sensor 106L and the signal of the rotation sensor 106R. The signals of the rotation sensors 106L and 106R are associated with brake operations. Thus, the load is increased by these brake operations, and a braking action is achieved.

As described above, the load is applied on the flywheel 30 by controlling a tilt angle of the load plate 90 under the operation of the motor 96, thereby changing the distance between the ferrite magnets 98 and the rim 30a.

In Step S104, corner control is performed in the case where the simulated travel situation is cornering. Cornering includes traveling around a corner, making an U-turn and the like. The details of the corner control will be described later.

In Step S105, it is determined whether to terminate the travel mode by checking predetermined conditions. If the travel mode is to be continued, the process returns to Step S101 described above.

Note that, during execution of the travel mode described above, the signal of the mat switch 16 is checked. If the mat switch 16 is turned on during traveling in which the travel speed V is not zero (0), an instruction "Do not put your foot on the floor during operation." may be made. It is only necessary for the driver to step on the mat switch 16 in order to terminate the driving simulation of the bicycle simulation apparatus 10. Thus, no special operations are required.

Meanwhile, in addition to the process of the travel mode shown in FIG. 15, the processes of the display controller 184 are concurrently executed by multitask processing. The display controller 184 is implemented while transmitting/receiving data to/from an execution section of the travel mode, and performs control for changing scenes to be displayed on the screen 14a. In this display control, based on the travel speed V obtained in Step S101 described above and the steering angle $\theta_H$ of the handlebars 28, which is detected by the steering angle sensor 50, the scenes to be displayed on the screen 14a are changed in real time.

Moreover, the viewpoint of the scenes displayed on the screen 14a is changed based on the voice command obtained in Step S102 described above. When the voice command received is "left," a scene assumed to be on the left side of the driver is displayed, and when the voice command received is "right," a scene assumed to be on the right side of the driver is displayed. When the voice command received is "front," the display is returned to the front view scene as viewed by the driver.

Furthermore, when the voice command received is "up," a bird's-eye scene facing forward obliquely from behind is displayed together with the image of the bicycle and the image of the person on the bicycle. When the voice command received is "down," a scene facing forward from the viewpoint of the driver himself/herself is displayed. When the voice command received is "rearward," a scene facing forward from a virtual vehicle running behind is displayed.

The display controller 184 described above is also concurrently operated as multitasking in the stepping mode, the walking mode and the walking back mode, and performs display on the screen 14a in real time throughout operation in these modes.

Figure 16:
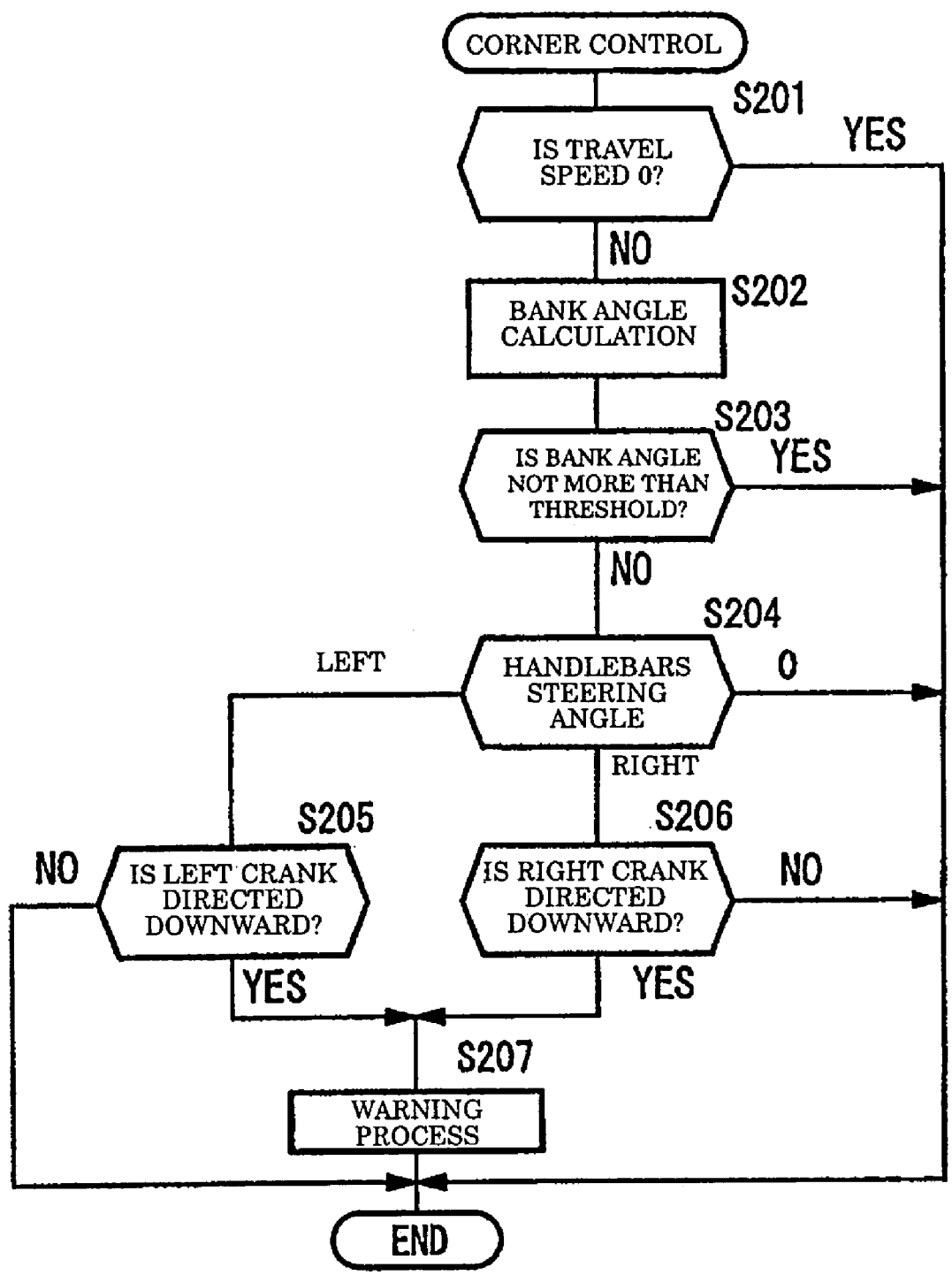
FIG. 16 is a flowchart of a corner control.

As shown in FIG. 16, when the simulation proceeds to the corner control mode per Step S104 in FIG. 15, the following steps are executed. First, it is checked, in Step S201, whether the travel speed V is zero (0). Since the bicycle is stopping when the travel speed V is zero (0), the process of the corner control is terminated. If V is not equal to zero (0), it is determined that the bicycle is traveling, and the process moves to Step S202.

In Step S202, a simulated bank angle $\theta_B$ is obtained from the travel speed V and the steering angle $\theta_H$ of the handlebars 28. By obtaining the bank angle $\theta_B$ and creating various travel situations, a realistic driving simulation is possible.

In Step S203, it is checked whether the bank angle $\theta_B$ is not less than a predetermined threshold. If the bank angle $\theta_B$ is not less than the threshold, the corner control is terminated. If the angle is less than the threshold, the process moves to Step S204.

In Step S204, the steering angle $\theta_H$ of the handlebars 28 is checked. Since the bicycle is going straight when the steering angle $\theta_H$ is zero (0), if the steering angle is zero (0), the process of the corner control is terminated. When the steering angle $\theta_H$ is a positive value and the driver is steering to the left, the process moves to Step S205. When the steering angle $\theta_H$ is a negative value and the driver is steering to the right, the process moves to Step S206.

In Step S205, it is checked whether the left crank 36L is directed downward. To be more specific, since the crank 36L is directed downward when the left approach sensor 132L is on, the signal of the left approach sensor 132L is checked. If the signal of the left approach sensor 132L is on, the process moves to Step S207. If the signal of the left approach sensor 132L is off, the process of the corner control is terminated.

In Step S206, it is checked whether the right crank 36R is directed downward. To be more specific, since the crank 36R is directed downward when the right approach sensor 132R is on, the signal of the right approach sensor 132R is checked. If the signal of the right approach sensor 132R is on, the process moves to Step S207, and if the signal of the right approach sensor 132R is off, the process of the corner control is terminated.

In Step S207, a warning process is performed. Specifically, Step S207 is performed under conditions in which the bank angle $\theta_B$ is not less than a predetermined angle during cornering, and where the crank 36L or the crank 36R toward the inside during cornering is directed downward. Thus, the driving simulation is operating in a situation where the pedal 38L provided on the end of the crank 36L or the pedal 38R provided on the end of the crank 36R appears to rubs the road surface. By sending out a warning of such a situation, it is possible to allow the driver to learn a basic method of operating the bicycle so as to avoid these circumstances.

The warning described above is given by the warning section 188 (see FIG. 10) in cooperation with the display controller 184 and the sound driver 186. In this warning, a simulated sound of the pedals 38L and 38R rubbing the road surface is emitted from the speakers 15, and an image in which a bicycle and a person on the bicycle are staggering is displayed on the screen 14a by the display controller 184 (see FIG. 17). Moreover, in this image, particularly, the pedal 38L or 38R rubbing the road surface may be highlighted by blinking display, color change display or the like. Moreover, a message such as "warning" may be displayed on the screen 14a and highlighted.

As described above, by giving a visible and audible warning to the driver, the driver can feel as if the pedal 38L or 38R actually is rubbing the road surface. Thus, the warning is very effective in terms of the driver learning operation of a bicycle.

Moreover, in accordance with preference of the driver, a method for giving this warning may be selected. For example, electronic warning sound may be emitted, or a message "the pedal is rubbing the road surface" may be given by voice. Moreover, in the case where the bicycle simulation apparatus 10 is used for games, score deduction process may be performed in the Step S207. This score deduction process may be performed during various kinds of warning processes to be described later.

After completion of step S207, the corner control process is terminated. Note that, in this corner control process, only the state of the crank facing toward the inside of the corner is to be examined. However, the state of the crank facing toward the outside of the corner, which is on the opposite side, may be examined. Specifically, it is considered preferable that, during high-speed cornering of the bicycle, the pedal facing toward the outside of the corner be pressed down with some pressure. Thus, point addition process or the like may be performed by monitoring whether the crank facing toward the outside of the corner is properly pressed down.

In the corner control process, a warning may be issued in Step S207 if the handlebars 28 are operated by a predetermined amount or more in the same direction as the direction in which the crank is pressed down, regardless of the bank angle $\theta_B$. Moreover, a warning may be issued for an excessive steering angle for a given travel speed, as determined by searching a predetermined map based on the travel speed V and the steering angle $\theta_H$.

Next, the stepping mode will be described. The stepping mode is a mode which permits the driver to stop at a location corresponding to a temporary stop or the like, and to perform an operation such as safety check by putting his/her feet on the road surface.

Figure 18:
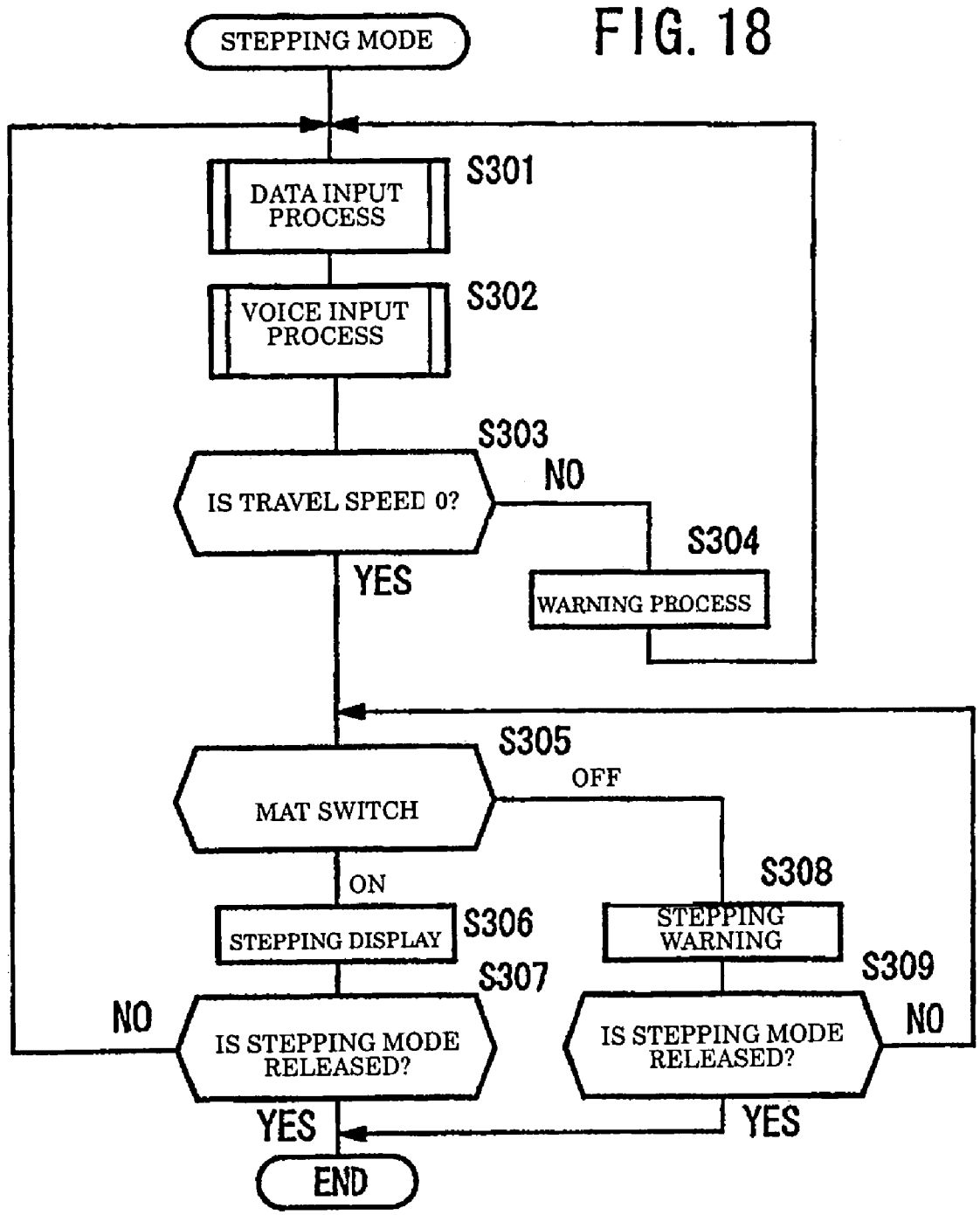
FIG. 18 is a flowchart of a stepping mode.
Figure 19:
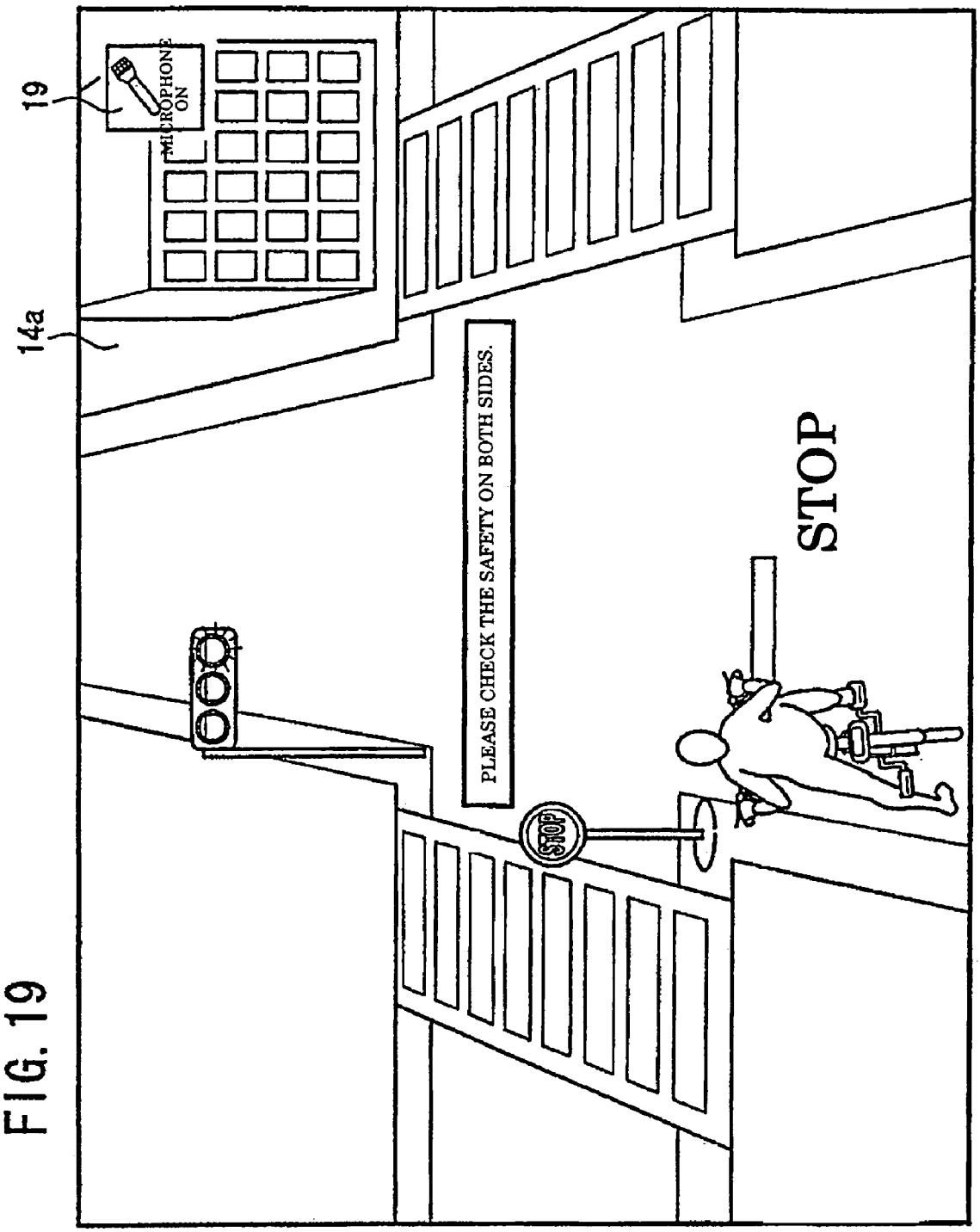
FIG. 19 is a screen display showing a state of a temporary stop in the stepping mode.

As shown in FIG. 18, when the simulation proceeds to the stepping mode per Step S7 in FIG. 13, the same data input process and voice input process as those of Steps S101 and S102 (see FIG. 15) described above are performed in Steps S301 and S302.

Next, in Step S303, it is checked whether the travel speed V is zero (0). If the travel speed V is not zero (0), the application proceeds to step S304 and the warning process is performed, and, thereafter, the process returns to Step S301. Specifically, the process stands by while continuously performing Steps S301 to S304 until the travel speed V becomes zero (0). If the travel speed V is zero (0), the process moves to the next Step S305.

In the warning process in Step S304, for example, an instruction such as "Brake and stop." is made. Moreover, if it is determined that the driving simulation is in a situation where the bicycle crosses a stop line at an intersection or the like, a loud warning or a warning of more highlighted display is given as a higher level warning. Alternatively, the driving simulation may be aborted.

In Step S305, as in the case of Step S1 described above, it is checked whether the mat switch 16 is turned on. Specifically, it is determined whether at least one of the left and right switches 150L and 150R is turned on. If the mat switch 16 is turned on, the process moves to Step S307, and if the switch is off, the process moves to Step S308.

In Step S306, an image of a bicycle and an image of a person putting his/her feet on the road surface while sitting on the saddle of the bicycle (see FIG. 19) are displayed on the display screen 14a by the display controller 184. Moreover, an instruction "Check the safety on both sides." is provided on the display screen 14a.

In the Step S306, for example, in order to surely check the safety on both sides, the driver may be allowed to utter "left" and "right." In this case, the voice is recognized by the voice recognition section 190, and images on the left and right sides at the spot of temporary stop are displayed on the screen 14a. Accordingly, if an approaching vehicle is displayed on these images, preferably, restart is prohibited.

In Step S307, it is checked whether the stepping mode is released. If the mode is not released, the process returns to Step S301 to continue the stepping mode process. Meanwhile, if the mode is released, the stepping mode process is terminated. The stepping mode is released, for example, in certain situations within the driving simulation, such as when a traffic signal changes from red to green, or when traffic safety on the left and right sides is carefully checked.

Meanwhile, in Step S308, a warning is given to indicate that the driver should place his/her feet on the road, since sensors indicate that the driver is not putting his/her feet down even though the travel speed is zero (0). Specifically, in operating not only a bicycle but also two-wheeled vehicles including a motorcycle and the like, it is important in terms of safety education, to put feet down and completely stop at a stop sign. Specifically, merely slowing down, or stopping for a moment and restarting without putting feet down, must be avoided. Therefore, the warning advising putting the feet on the road is given if it is determined that the feet are not put down based on the signal of the mat switch 16.

Figure 20:
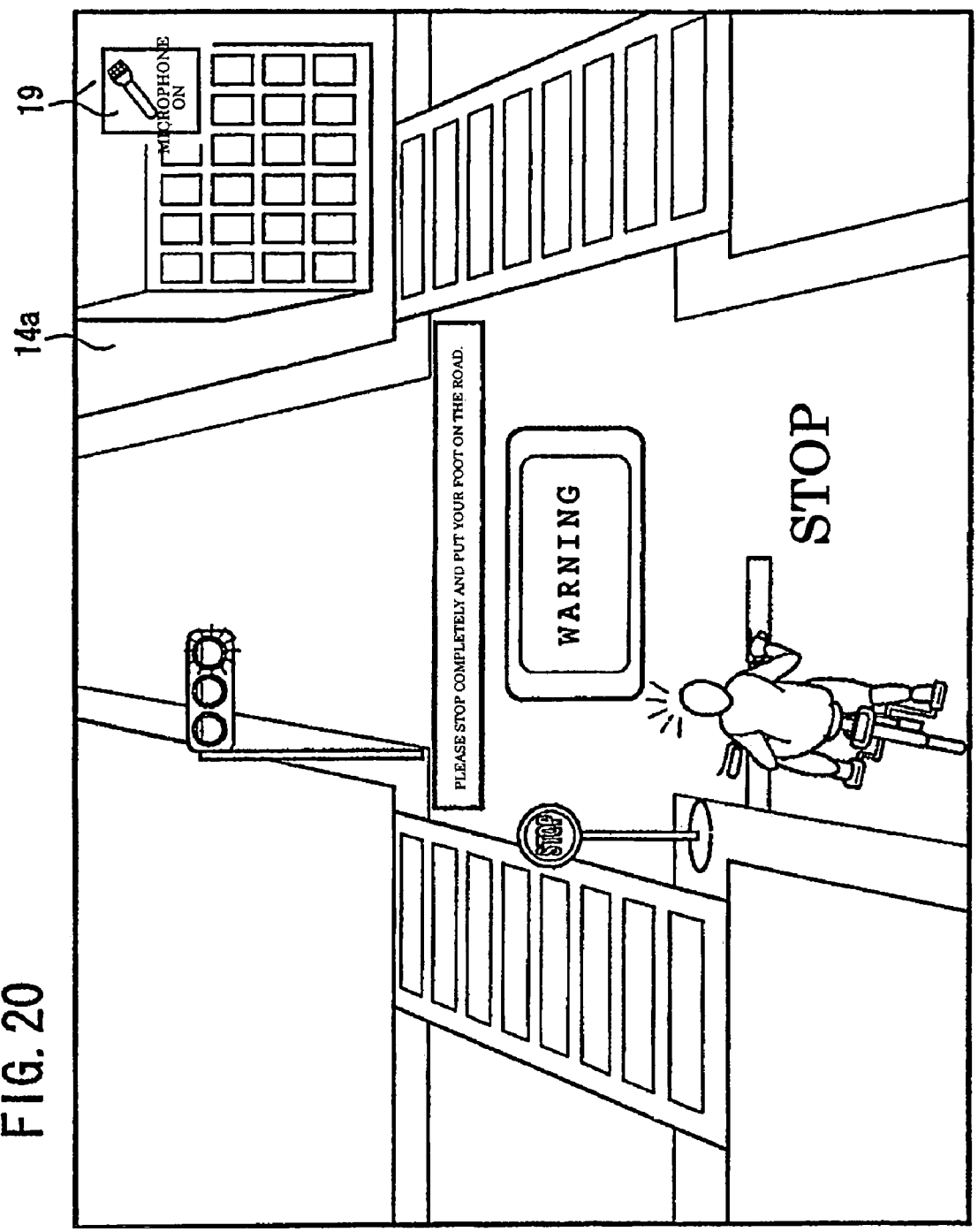
FIG. 20 is a screen display showing a warning in the stepping mode.

In the warning advising putting the feet on the road, as shown in FIG. 20, an image in which a bicycle and a person on the bicycle tumble (or stagger) may be displayed on the display screen 14a by the display controller 184. Moreover, instructions such as "Warning" and "Please stop completely and put your feet on the road." may be given.

Moreover, the number of times the Step S308 has been executed may be counted. If the number reaches a predetermined value or more, an image in which the bicycle has completely tumbled may be displayed on the display screen 14a, and a high-level warning may be given.

In Step S309, as in the case of Step S307 described above, it is checked whether the stepping mode is released. If the mode is released, the stepping mode process is terminated, and if the mode is not released, the process returns to Step S305.

Next, the walking mode will be described. The walking mode is a mode which permits the driver to walk the bicycle on a pedestrian dedicated road or the like. The walking mode is, for example, a mode for learning how to walk a bicycle without disturbing other pedestrians and the like.

Figure 21:
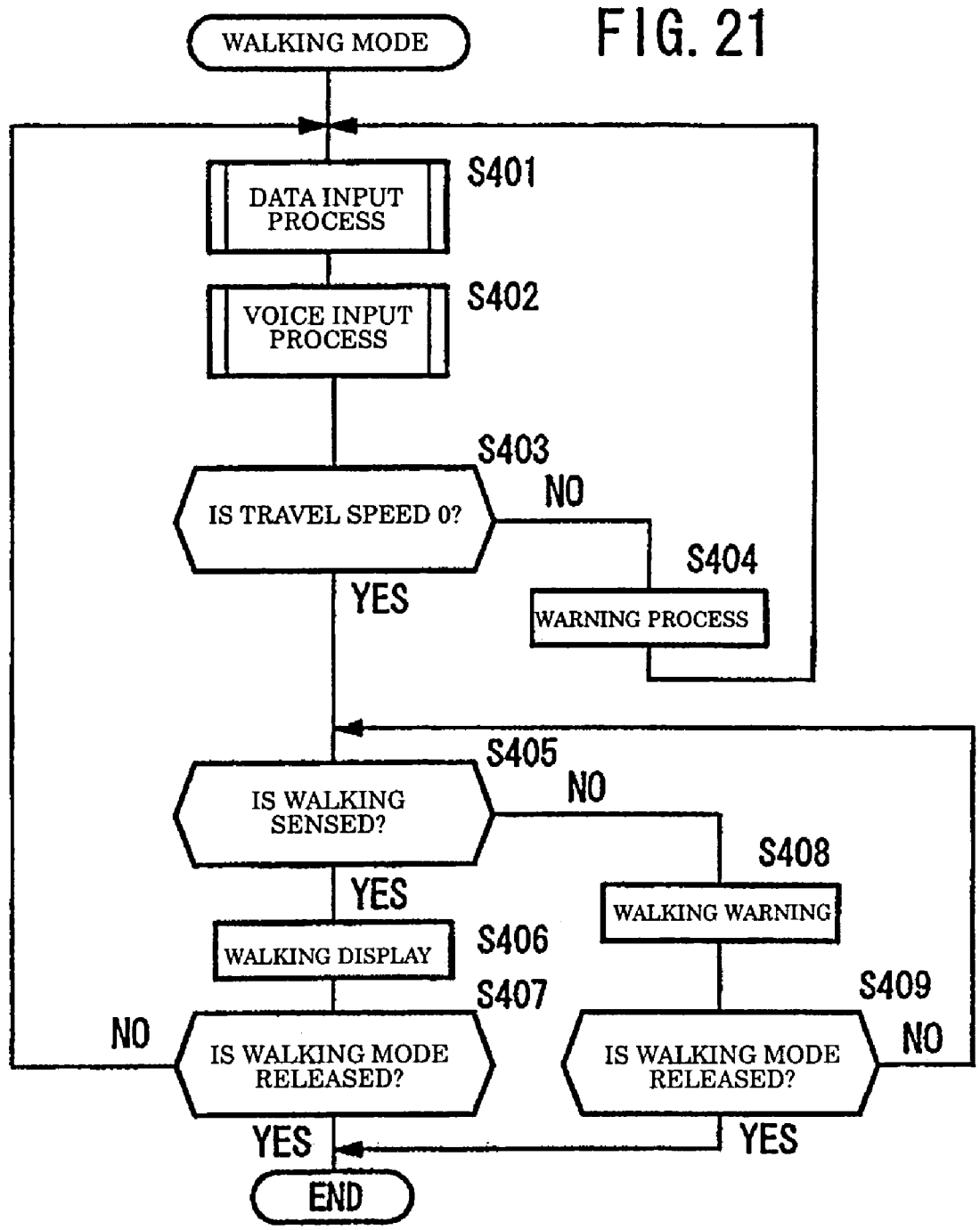
FIG. 21 is a flowchart of a walking mode.

As shown in FIG. 21, when the simulation proceeds to the walking mode per Step S9 in FIG. 13, the same processes as those of Steps S301 to S304 described above are executed. In other words, the data input process, the voice input process, the travel speed check process and the warning process are performed in Steps S401 to S404, respectively.

If the travel speed V is zero (0) in Step S403, the application proceeds to Step S405, where it is checked whether the driver is walking. When walking is sensed via mat 16, the process moves to Step S406. In other cases, the process moves to Step S408.

Figure 22:
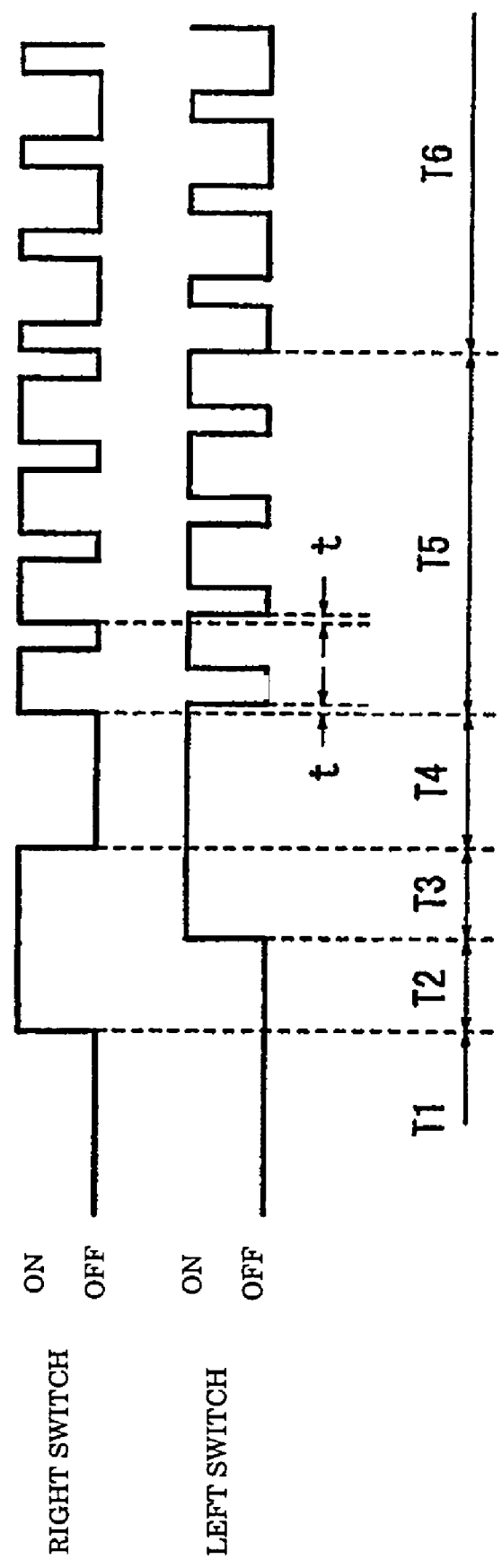
FIG. 22 is an input signal time chart of a right switch and a left switch in a mat switch assembly.

Walking is sensed through a sensor signal analysis based on signals of the left and right switches 150L and 150R. As seen in FIG. 22, in a time period T1 in which both of the left and right switches 150L and 150R are continuously off for a predetermined time or more, it is determined that the driver is riding on the bicycle. In time periods T2 and T4, in which only one of the left and right switches 150L and 150R is on for a predetermined time or more, it is determined that the driver's foot is on the road. In a time period T3 in which both of the left and right switches 150L and 150R are continuously on for a predetermined time or more, it is determined that both of the driver's feet are on the road. In a time period T5 in which the left and right switches 150L and 150R are alternately and repeatedly turned on and off, and includes a time interval t when both of the left and right switches 150L and 150R are turned on, it is determined that the driver is walking the bicycle. Moreover, in a time period T6, in which the left and right switches 150L and 150R are alternately and repeatedly turned on and off and which does not include a time interval wherein both of the left and right switches 150L and 150R are turned on, it is determined that the driver is running while pushing the bicycle.

Specifically, in Step S405, when the signals are activated in the pattern shown in time period T5, the process moves to Step S406. Otherwise, the process moves to Step S408.

Figure 23:
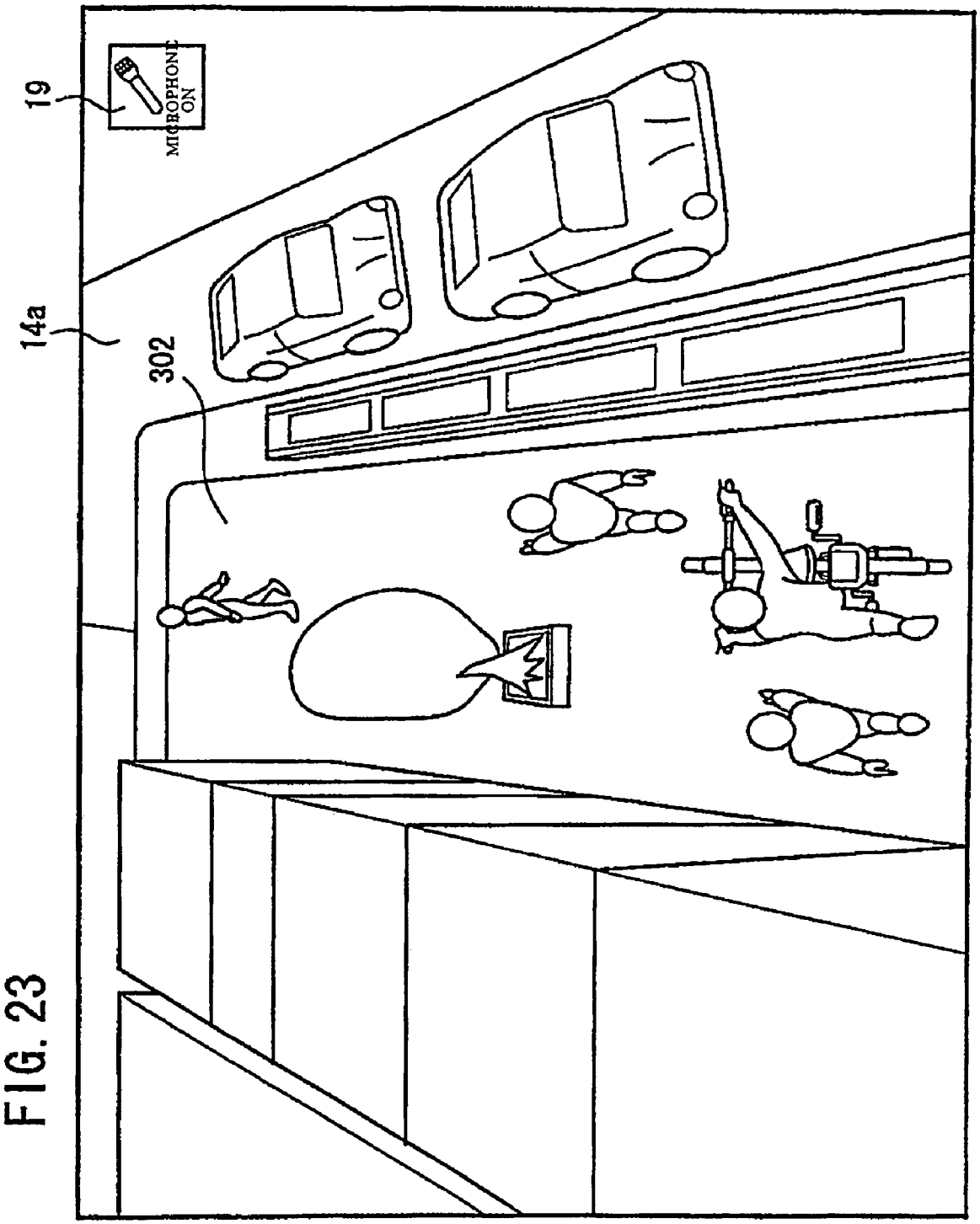
FIG. 23 is a screen display in the walking mode.

In Step S406, an image in which a dismounted driver is walking the bicycle is displayed on the display screen 14a by the display controller 184 (see FIG. 23). In this event, based on the steering angle $\theta_H$ detected by the steering angle sensor 50, the travel direction of the bicycle on the screen 14a may be changed. Moreover, the forward speed of the driver may be changed upon determination, based on sensor input, of a distinction between walking the bicycle and running while pushing the bicycle.

In Step S407, it is determined whether the walking mode is released. If the mode is not released, the process returns to Step S401 to continue the process of the walking mode. If the mode is released, the process of the walking mode is terminated. The walking mode is released, for example, when the driver reaches an end of a sidewalk or an end of a pedestrian crossing on which the driver is walking the bicycle.

Meanwhile, in Step S408, a walking warning is given since the driver is not walking the bicycle. Specifically, since two-wheeled vehicles such as a bicycle should be walked on sidewalks, a predetermined warning is given based on the signal of the mat switch 16 when the vehicle is not walked at appropriate times during simulated conditions.

The walking warning includes, for example, instructions such as "Warning," "Please stop and walk the bicycle," "Please walk" and "Please do not run". Moreover, the number of times that Step S408 is executed may be counted. If the number reaches a predetermined value or more, a high-level warning may be given.

In Step S409, as in the case of Step S407 described above, it is determined whether the walking mode is released. If the mode is released, the process of the walking mode is terminated. If the mode is not released, the process returns to Step S405.

Figure 24:
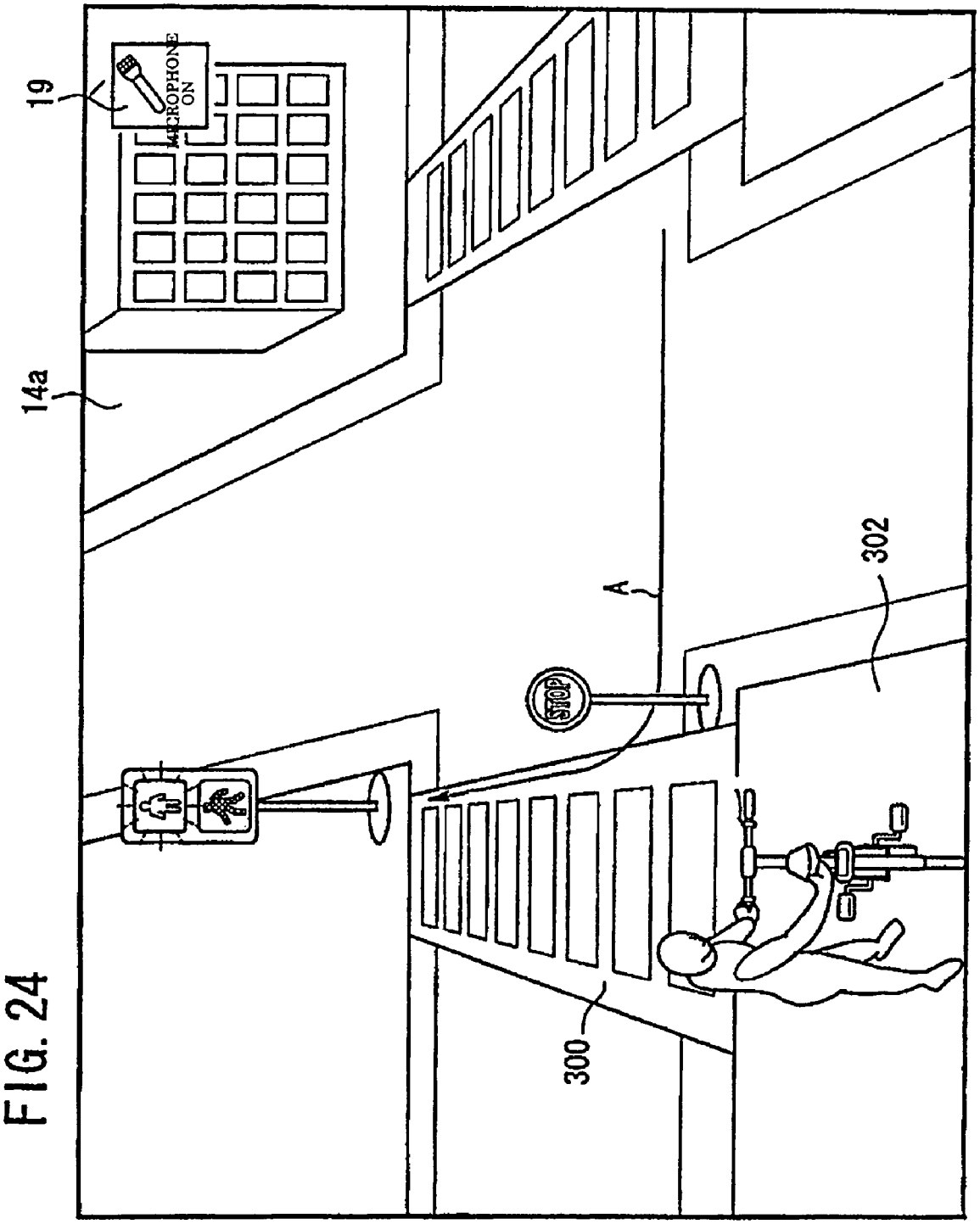
FIG. 24 is a screen display showing a state of walking back from a pedestrian crossing in a walking back mode.

Next, the walking back mode will be described. The walking back mode is a mode in which the driver, who has dismounted from the bicycle, reverses direction and walks the bicycle back to a previous location. For example, as shown in FIG. 24, when the driver tries to turn right at an intersection while traveling on the left side of a roadway, the driver first goes straight (traveling from right to left in the image of FIG. 24) to cross the first street, then turns right onto a pedestrian crossing 300 so as to follow a route indicated by an arrow A. However, when the light is red, the driver moves backward in order to escape to a sidewalk 302. In this event, the walking back mode is set.

Figure 25:
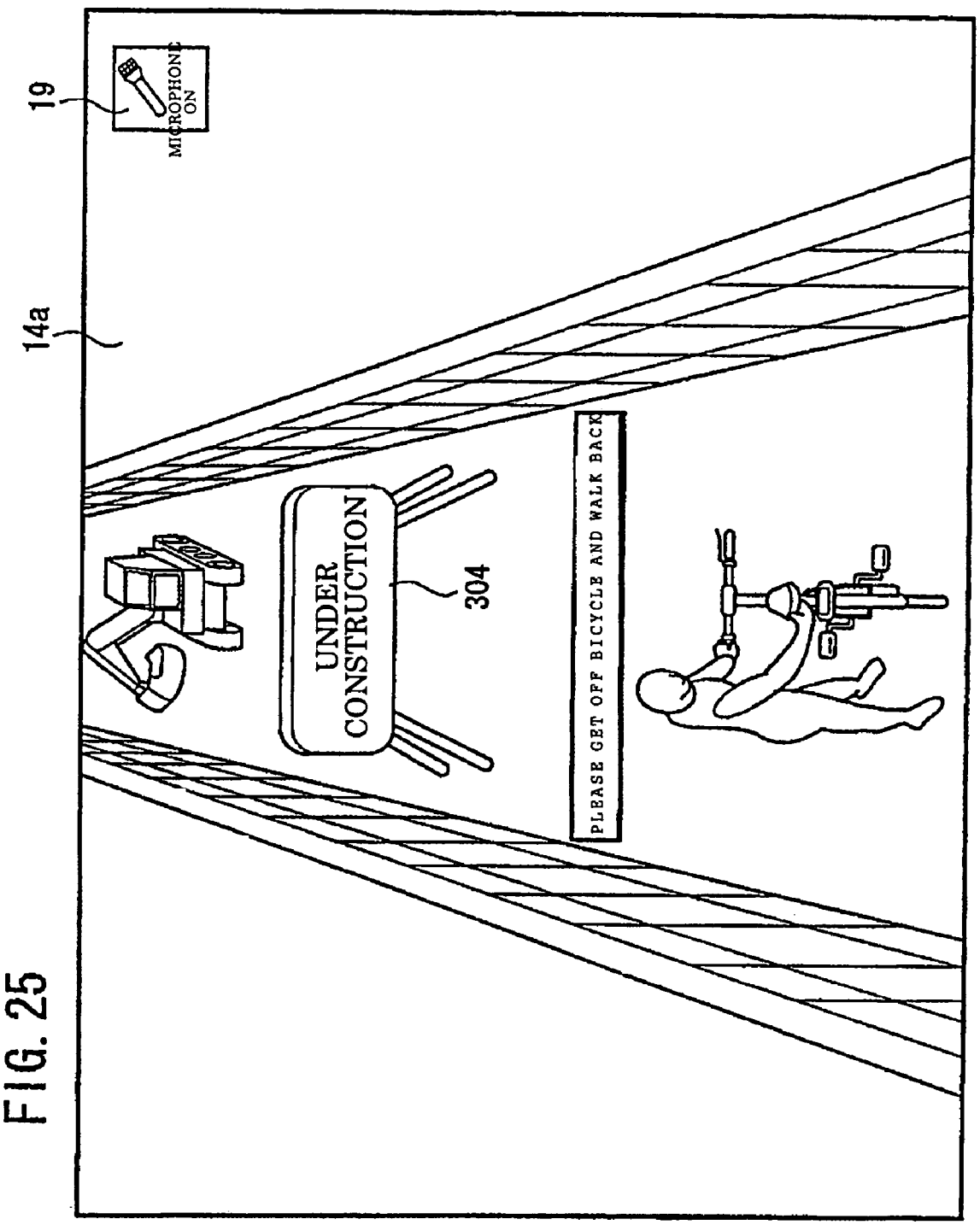
FIG. 25 is a screen display showing a state of walking back from the vicinity of an obstacle in the walking back mode.

Moreover, certain simulated situations are provided in which the bicycle cannot move forward and has to move backward. For example, as shown in FIG. 25, if the bicycle comes too close to a dummy obstacle 304 ahead of the bicycle, the bicycle cannot proceed and has to move backward. Thus, in such a case, the walking back mode is set. As a second example, when taking the bicycle in and out of a parking space, the walking back mode simulating a walking back operation may be set.

Figure 26:
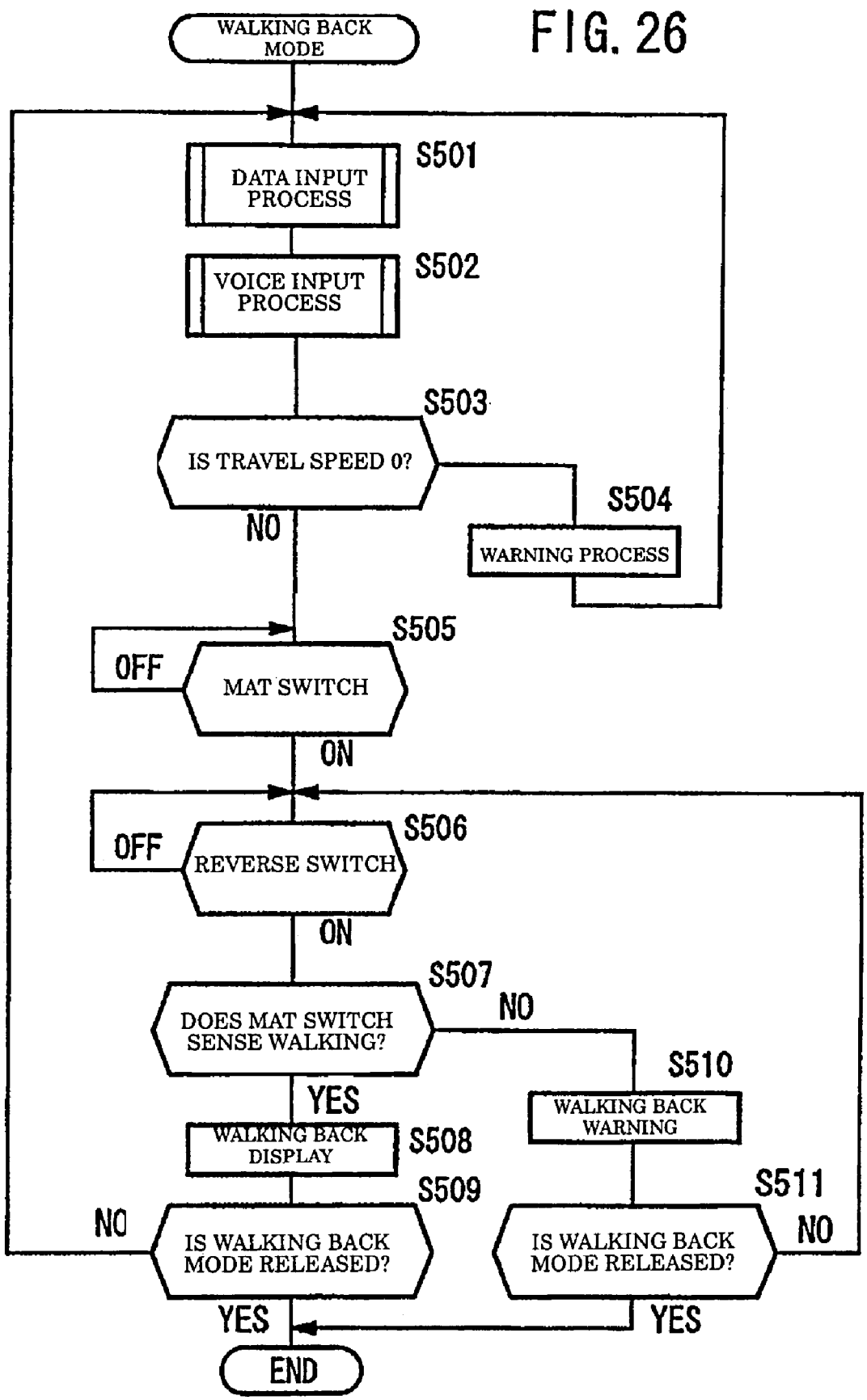
FIG. 26 is a flowchart of the walking back mode.

As shown in FIG. 26, when the simulation proceeds to the walking back mode per Step S11 in FIG. 13, the same processes as those of Steps S301 to S304 described above are executed. In other words, the data input process, the voice input process, the travel speed check process and the warning process are performed in Steps S501 to S504, respectively.

When, in Step S503, the travel speed V is zero (0), as in the case of Step S1 described above, the process proceeds to Step S505 where it is checked whether the mat switch 16 is turned on. When the mat switch 16 is turned on, the process moves to Step S506, and when the switch is off, the process stands by in Step S503.

In Step S506, it is checked whether the reverse switch 140 is turned on. When the reverse switch 140 is turned on, the process moves to Step S507, and when the switch is off, the process stands by in Step S506. Specifically, when the driver gets off the bicycle and walks the bicycle back to a previous location, the driver generally walks back while holding the left portion of the handlebars 28 in his/her left hand and holding the saddle 24 in his/her right hand (see the images of the persons in FIGS. 24 and 25). This is because, when the driver tries to walk the bicycle back while holding only the handlebars 28 without holding the saddle 24, the handlebars 28 are rotated at the head tube 26, and the direction of walking back is indeterminate. Therefore, by holding the saddle 24 together with the lever 142, a good posture for walking the bicycle back is obtained. In this event, since the reverse switch 140 is turned on through the handgrip on the saddle 24, it is possible to recognize that the driver is ready to walk the bicycle back by detecting a signal of the reverse switch 140.

Moreover, the reverse switch 140 is provided underneath a rear portion of the saddle 24. Thus, when the driver sits on the saddle 24 and performs normal travel simulation in the travel mode described above or the like, the driver is unlikely to touch the reverse switch. Consequently, there is no risk of operating the reverse switch by accident. Specifically, the reverse switch 140 is disposed in a position which facilitates operation by the driver only when the driver gets off the bicycle. Thus, the walking back operation performed after getting off the bicycle becomes more realistic.

In Step S507, walking is sensed using mat 16 in approximately in the same manner as Step S405 described above. If walking is sensed, the process moves to Step S508. In other cases, the process moves to Step S510. In this event, since the driver stands next to the bicycle simulator 12, the driver steps on any one of the left and right switches 150L and 150R of the mat switch 16 at predetermined time intervals. Therefore, assuming the case where, for example, the driver stands on the left side of the bicycle simulator 12, a walking state may be detected based on only the signal of the left switch 150L, as discussed above with respect to the time chart of FIG. 22. Accordingly, when signals are obtained having the pattern shown in time periods T5 and T6, it may be determined that the driver is in the walking state.

In Step S508, as shown in FIGS. 24 and 25, an image in which a driver, who has dismounted from a bicycle, walks the bicycle back is displayed on the display screen 14a by the display controller 184. In this event, a walking back direction of the bicycle on the display screen 14a may be changed based on the steering angle $\theta_H$ detected by the steering angle sensor 50.

In Step S509, it is determined whether the walking back mode is released. If the mode is not released, the process returns to Step S501 to continue the walking back mode process. If the mode is released, the walking back mode process is terminated. In the case of the example shown in FIG. 24, the walking back mode is released when the bicycle completely moves back to the sidewalk 302 from the pedestrian crossing 300.

As described above, in the walking back mode, based on the movement of the driver operating the grip detector 56 of the bicycle simulator 12 as well as stepping on the mat switch 16 at predetermined time intervals, an image corresponding thereto is displayed on the screen 14a. Thus, the driver can feel as if he/she is actually walking the bicycle back. Moreover, after the bicycle has completely moved back, the walking back mode is released and the bicycle can move in any direction. Therefore, even if the bicycle comes too close to a simulated obstacle during the driving simulation, it unnecessary to terminate the driving simulation or perform an unnatural process such as deletion of the simulated obstacle. Thus, a realistic operation can be achieved.

Next, with reference to FIG. 27, description will be given of the contents of the voice recognition process performed in Steps S102, S302, S402 and S502 described above.

First, in Step S601, it is checked whether the driving simulation is in a situation where voice input is enabled. If the voice input is disabled, the process moves to Step S602, and if the voice input is enabled, the process moves to Step S603.

The voice input is enabled in several specific situations. For example, the voice in put is enabled when the simulation is in the foot-landing mode, the walking mode, the walking back mode, and travel modes other than cornering. The voice input is enabled in situations corresponding to the case where the process load applied on the CPU is relatively small. Accordingly, the voice input is disabled in situations where, for example, relatively large applied-load processes such as the arithmetic operation of the bank angle $\theta_B$, and determination of rotational angles of the cranks 36L and 36R based on signals of the left and right approach sensors 132L and 132R during cornering or the like in the travel mode are executed. The voice input is disabled in the case where the processing load applied on the CPU is relatively large.

Moreover, the processing load applied on the main controller 18 may be monitored based on a predetermined system monitor and a resource meter. If the processing load is not less than a predetermined value, the voice input may be disabled.

In Step S602, the voice recognition mark 19 on the display screen 14a is deleted or displayed so as to be faded, thereby showing that voice recognition is disabled. After the process of Step S602, the current process in the voice recognition process shown in FIG. 27 is terminated.

Meanwhile, in Step S603, the voice recognition mark 19 is clearly displayed on the display screen 14a, thereby showing that the voice recognition is enabled. The operator can easily recognize that the voice recognition process is enabled at the point by observing the voice recognition mark 19.

Whether the voice input is enabled may be indicated by, for example, turning on and off a predetermined indicator light. In this case, the indicator light may be provided in the vicinity of the visual display monitor 14 or the microphone 52.

In Step S604 (dictionary selection section), one of the types of dictionary data recorded in the storage section 194 is selected. Specifically, the stop/walking dictionary data 200 is selected in the modes other than the travel mode, the town travel dictionary data 202 is selected in a situation of traveling through town in the travel mode, and the suburban travel dictionary data 204 is selected in a situation of traveling in the suburbs in the travel mode.

Moreover, if it is determined that the operator is a child based on the flags set in Step S3 described above, the child dictionary data 200a, 202a and 204a and the common dictionary data 200c, 202c and 204c are selected. If it is determined that the operator is an adult, the adult dictionary data 200b, 202b and 204b and the common dictionary data 200c, 202c and 204c are selected.

For example, if the operator is a child in the situation of traveling through town, the child dictionary data 202a and the common dictionary data 202c among the town traveling dictionary data 202 are selected.

Note that selection of the dictionary data may be performed when a mode transitions (for example, during branch processing in Steps S4, S6, S8 and S10 in FIG. 13). In addition, predetermined dictionary data may be previously loaded into the RAM and the like from the storage section 194. Thus, high-speed data access is possible.

In Step S605, the operator's voice command inputted from the microphone 52 is analyzed, and it is recognized that the operator said "right" or "left," for example.

In Step S606, by referring to the operator's voice command recognized in Step S605 described above, and the dictionary data selected in Step S604 described above, phrase data matching the recognized voice is searched for and specified.

In Step S607, it is checked whether matching phrase data exists in the dictionary data by search process in Step S606. If the matching phrase data exists, the process moves to Step S608, and if not, the current process is terminated.

In Step S608, the voice command process is performed based on the phrase data matching the recognized voice. For example, when the recognized voice is recognized as "left" in the case where the town travel dictionary data 202 is selected, a scene assumed to be on the left side of the operator is displayed on the screen 14a in cooperation with the display controller 184 after the common dictionary data 202c (see FIG. 12) is referred to. Moreover, when the operator is a child and the recognized voice is recognized as "heavy" in the case where the town travel dictionary data 202 is selected, the child dictionary data 202a is referred to, and, thereafter, the load plate 90 is tilted so as to approach the rim 30a by rotating the motor 96 through the sub-controller 58 as well as the speed coefficient for calculating the travel speed V is increased. Furthermore, the value of the gear ratio assumed at the point is displayed on the screen 14a. After the process of this Step S608, the current voice recognition process shown in FIG. 27 is terminated.

In such a voice recognition process, voice analysis is performed by selecting a type of dictionary data corresponding to the mode of travel and the operator. Thus, the volume of the individual dictionary data may be small, and the processing loads when the main controller 18 refers to and searches the dictionary data are small. Thus, high-speed processing is possible. Moreover, the CPU, the RAM and the like of the main controller 18 may be inexpensive or of low capacity. Furthermore, the dictionary data are individually provided in accordance with the modes of travel and the operator. Accordingly, a situation is avoided in which similar data exist as the recorded phrase data, and erroneous recognition of voices is prevented. Thus, recognition accuracy is improved.

Since the child dictionary data 200a, 202a and 204a and the adult dictionary data 200b, 202b and 204b are provided, words generally used by children (for example, the word "heavy") and words used by adults (for example, the word "upshift") can be used to comfortably execute voice commands. In addition, drivers in a wide range of ages can use the apparatus 10. Since the child dictionary data 200a, 202a and 204a and the adult dictionary data 200b, 202b and 204b are separated, there are no problems such as erroneous recognition of voices and lowering of the processing speed, which are caused by designing a system for both children and adults. Since a bicycle is a vehicle driven by both a child and an adult, such a voice recognition process is effective particularly in the bicycle simulation apparatus 10 for a bicycle among various bicycle simulation apparatuses. Moreover, separation of the dictionary data by language, such as Japanese and English, is effective in the bicycle simulation apparatus 10 used in a plurality of destinations, including exports.

Furthermore, the voice recognition process can be stopped in predetermined situations. Thus, the processing load applied on the CPU can be suppressed, and the load can be equalized. Therefore, CPU performance in a light load never becomes redundant, and the CPU operation rate can be improved. Moreover, in accordance with the specific operating state of the voice recognition process, the voice recognition mark 19 is displayed, or not displayed, on the display screen 14a. Accordingly, the driver can check the operating state of the voice recognition process at a glance, and instructions can be given by voice at the appropriate time. Thus, excessive attention to timing of giving the voice instructions is not required. As a result, operability of the bicycle simulation apparatus 10 is improved.

Figure 28:
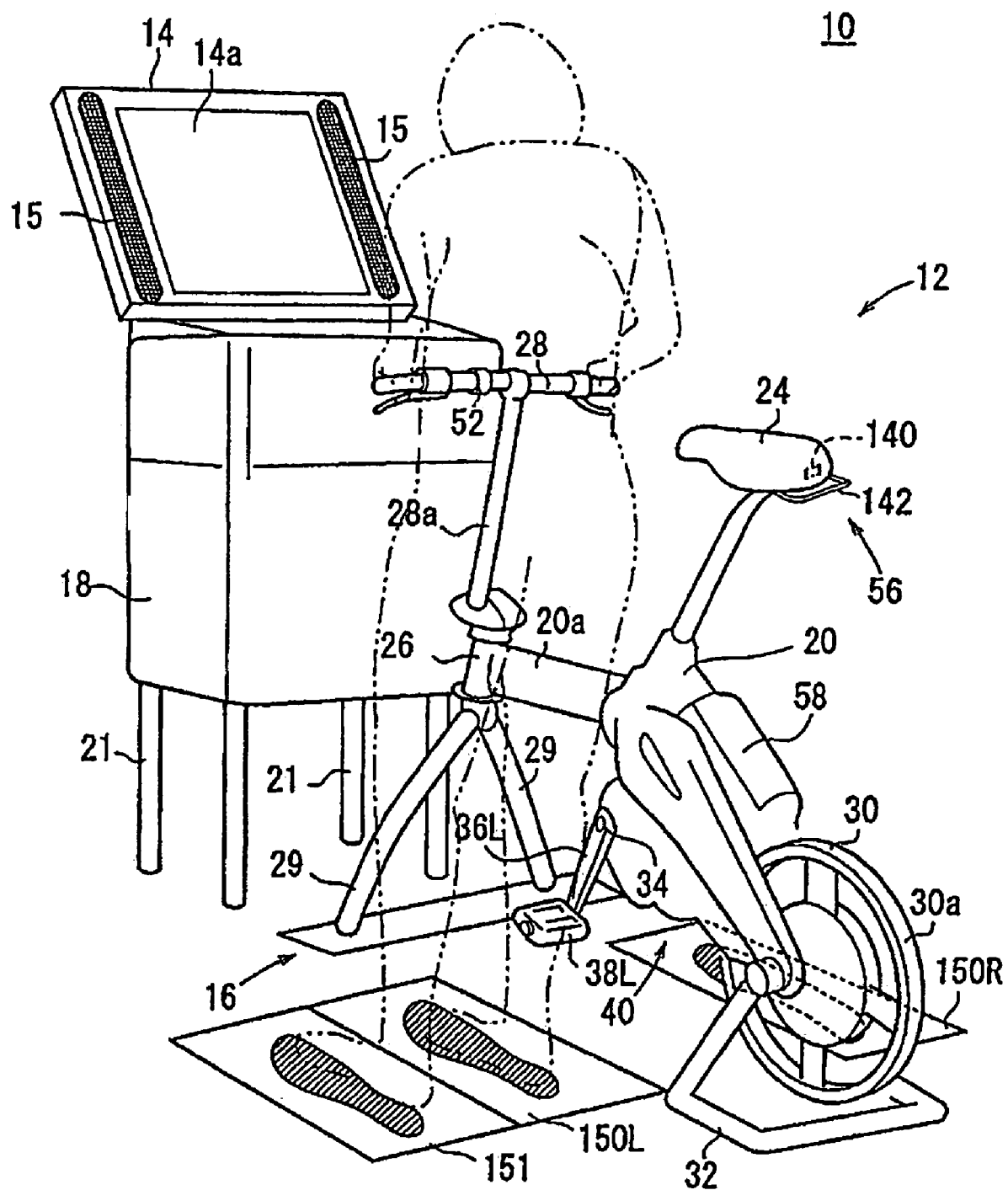
FIG. 28 is a perspective view of a bicycle simulation apparatus equipped with an additional switch.
Figure 29:
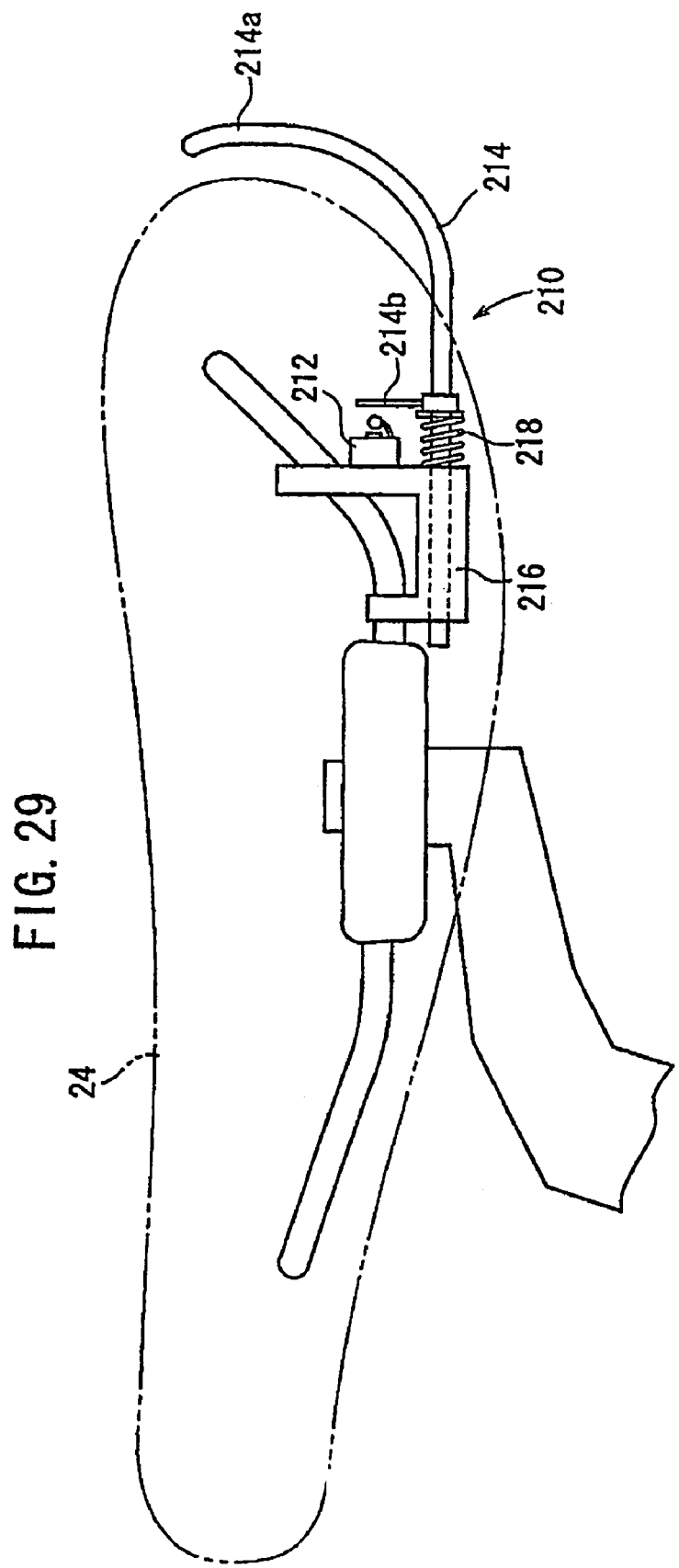
FIG. 29 is a schematic side view of a modified example of a grip detector.

Note that, as shown in FIG. 28, an additional switch 151 similar to the left switch 150L may be provided on the left side of the left switch 150L. Thus, simulated walking may be performed by alternately stepping on the left switch 150L and the additional switch 151 in the walking mode and the walking back mode. Consequently, the walking and walking back movements can be performed in the same posture as that of actually walking the bicycle. Thus, the hands-on feeling is further enhanced. In this case, the driver steps on the additional switch 151 with his/her left foot and steps on the left switch 150L with his/her right foot. In the case where the bicycle simulation apparatus 10 is used by persons accustomed to walking the bicycle by standing on the right side thereof, the additional switch 151 may be provided on the right side of the right switch 150R.

Moreover, in the above description, it is assumed that the grip detector 56 is provided underneath the rear portion of the saddle 24. However, an operating section corresponding to the grip detector 56 may be disposed in a position where the driver can easily operate the section in walking back movement. Thus, the grip operating section may be provided in the rear of the saddle 24, as in the example of a grip detector 210 shown in FIG. 29.

The grip detector 210 is a modified example of the grip detector 56, and includes a reverse switch 212. Reverse switch 212 is a momentary limit switch provided in the rear of the saddle 24. The grip detector 210 also includes a lever 214 for turning on and off the reverse switch 212, and a bracket 216 as a supporting unit. The lever 214 can be elastically slid forward against the elastic force of a spring 218 through the bracket 216 by operation of an operating portion 214a formed on the rear portion of lever 214. When the lever 214 slides forward, a contactor 214b comes into contact with the reverse switch 212 to turn on the switch. The operating portion 214a extends upward from the lower rear portion, and has approximately the same height as that of an upper rear portion of the saddle 24. After dismounting from the bicycle simulator 12, the driver can easily operate the grip detector by touching the upper surface of the saddle 24 and the rear surface of the operating portion 214a at the same time and pulling the operating portion 214a. This grip detector 210 achieves the same effect as that of the grip detector 56 described above.

Two-wheeled vehicles which may be simulated by the driving simulation of the two-wheeled vehicle simulation apparatus 10, include, but are not limited to, a motorcycle, a tricycle, a motor-assisted bicycle, and the like. The two-wheeled vehicle simulation apparatus 10 can simulate any vehicle which is driven by a driver sitting on the seat and which can be substantially considered as a two-wheeled vehicle.

It will be obvious that the two-wheeled vehicle simulation apparatus according to the present invention is not limited to the aforementioned embodiment and can adopt various constitutions without departing from the scope of the present invention.

While a working example of the present invention has been described above, the present invention is not limited to the working example described above, but various design alterations may be carried out without departing from the spirit and scope of the present invention as set forth in the claims.

The invention claimed is:

1. A two-wheeled vehicle simulation apparatus comprising:
   a two-wheeled vehicle simulator including a seat upon which a driver sits and a steering section operated by the driver;
   a driver sensing section which senses placement of a foot of the driver on a floor adjacent to the two-wheeled vehicle simulator; wherein the driver sensing section is a switch disposed on the floor adjacent to the two-wheeled vehicle simulator, the switch sensing the placement of the driver's foot on the switch; and
   a display section which displays information based on operation of the steering section and a signal of the driver sensing section; wherein the driver sensing section senses a users foot the two wheeled vehicle simulator is activated.

2. The two-wheeled vehicle simulation apparatus according to claim 1, wherein
   two or more of the driver sensing sections are provided, each of the driver sensing sections operating independently of the remaining driver sensing sections.

3. The two-wheeled vehicle simulation apparatus according to claim 2, wherein
   when two driver sensing sections substantially alternately detect the placement of the driver's feet thereon, images of a two-wheeled vehicle and a person walking the two-wheeled vehicle are displayed on the display section.

4. The two-wheeled vehicle simulation apparatus according to claim 1, wherein
   the driver sensing section is provided on the floor substantially underlying the seat such that the driver can step on the driver sensing section with his/her foot while sitting on the seat.

5. The two-wheeled vehicle simulation apparatus according to claim 1, wherein
   when the driver sensing section senses placement of the driver's foot thereon, an image of a person placing his/her foot on a road surface while sitting on a seat of a two-wheeled vehicle or an image of a person standing beside the two-wheeled vehicle is displayed on the display section.

6. The two-wheeled vehicle simulation apparatus according to claim 1, wherein
   any one of starting and terminating of a driving simulation is automatically performed by the two-wheeled vehicle simulator based on the signal of the driver sensing section.

7. The two-wheeled vehicle simulation apparatus according to claim 1 wherein
   the two-wheeled vehicle simulator further includes a voice recognition section.

8. The two-wheeled vehicle simulation apparatus according to claim 1 wherein
   the two-wheeled vehicle simulator further includes a voice recognition section operably connected to the display section such that the images presented by the display section are altered based on voice commands received by the voice recognition section.

9. The two-wheeled vehicle simulation apparatus according to claim 1 wherein
   the two-wheeled vehicle simulator further includes a voice recognition section comprising a phrase database, the phrase database comprising plural dictionaries, each dictionary directed to a unique user group.

* * * * *